(12) United States Patent  
Schlanger

(10) Patent No.: US 10,112,439 B2  
(45) Date of Patent: Oct. 30, 2018

(54) VEHICLE WHEEL AXLE ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 0 days.

(21) Appl. No.: 14/958,263

(22) Filed: Dec. 3, 2015

(65) Prior Publication Data

US 2016/0089930 A1    Mar. 31, 2016

Related U.S. Application Data

(63) Continuation-in-part of application No. 14/952,645, filed on Nov. 25, 2015, which is a continuation-in-part of application No. 14/602,543, filed on Jan. 22, 2015, now Pat. No. 9,561,833, which is a continuation-in-part of application No. 13/914,490, filed on Jun. 10, 2013, now Pat. No. 9,446,626, which is a continuation-in-part of application No. 12/655,433, filed on Dec. 30, 2009, now Pat. No. 8,485,335.

(60) Provisional application No. 62/124,391, filed on Dec. 18, 2014, provisional application No. 61/965,201, filed on Jan. 27, 2014.

(51) Int. Cl.  
*B60B 27/02* (2006.01)  
*B62K 25/02* (2006.01)

(52) U.S. Cl.  
CPC ............ *B60B 27/026* (2013.01); *B62K 25/02* (2013.01); *B62K 2206/00* (2013.01)

(58) Field of Classification Search  
CPC .............................. B60B 27/026; B62K 25/02  
See application file for complete search history.

(56) References Cited

U.S. PATENT DOCUMENTS

| | | | | |
|---|---|---|---|---|
| 4,400,038 | A * | 8/1983 | Hosokawa | B60B 27/023 |
| | | | | 280/288 |
| 5,302,067 | A * | 4/1994 | Rath | F16B 39/284 |
| | | | | 411/281 |
| 6,089,675 | A | 7/2000 | Schlanger | |
| 6,374,975 | B1 * | 4/2002 | Schlanger | B60B 27/026 |
| | | | | 192/46 |
| 7,628,416 | B2 * | 12/2009 | Hara | B62K 25/02 |
| | | | | 280/260 |
| 7,648,211 | B2 * | 1/2010 | Watarai | B60B 27/0052 |
| | | | | 301/110.5 |
| 7,654,548 | B2 * | 2/2010 | Kanehisa | B62K 21/02 |
| | | | | 280/260 |
| 7,669,871 | B2 * | 3/2010 | Watarai | B62K 25/02 |
| | | | | 280/260 |
| 7,909,412 | B2 * | 3/2011 | Ashman | B62K 25/02 |
| | | | | 301/110.5 |
| 7,926,886 | B1 * | 4/2011 | Ashman | B62K 25/02 |
| | | | | 301/110.5 |

(Continued)

*Primary Examiner* — Kip T Kotter

(57) ABSTRACT

A vehicle wheel hub assembly including: an axle assembly that is rotationally stationary about an axial axis; a hub shell rotatable about the axle assembly and about the axial axis; and a frame member to interface with the hub assembly. The axle assembly is secured to the frame member by means of a multi-lead threadable engagement. This threadable engagement may be manipulated between a threadably engaged arrangement to provide a retaining means to retain the hub shell to the frame member and a threadably released arrangement serving to remove the retaining means.

25 Claims, 11 Drawing Sheets

(56) References Cited

U.S. PATENT DOCUMENTS

| | | | | |
|---|---|---|---|---|
| 8,042,881 B2* | 10/2011 | Inoue | ............... | B62K 23/06 |
| | | | | 280/279 |
| 2003/0063962 A1* | 4/2003 | Nilsen | ............... | F16B 35/047 |
| | | | | 411/427 |
| 2006/0001310 A1* | 1/2006 | Crafts | ............... | B60B 3/16 |
| | | | | 301/35.621 |
| 2013/0270893 A1* | 10/2013 | Schlanger | ............. | B60B 27/026 |
| | | | | 301/105.1 |

* cited by examiner

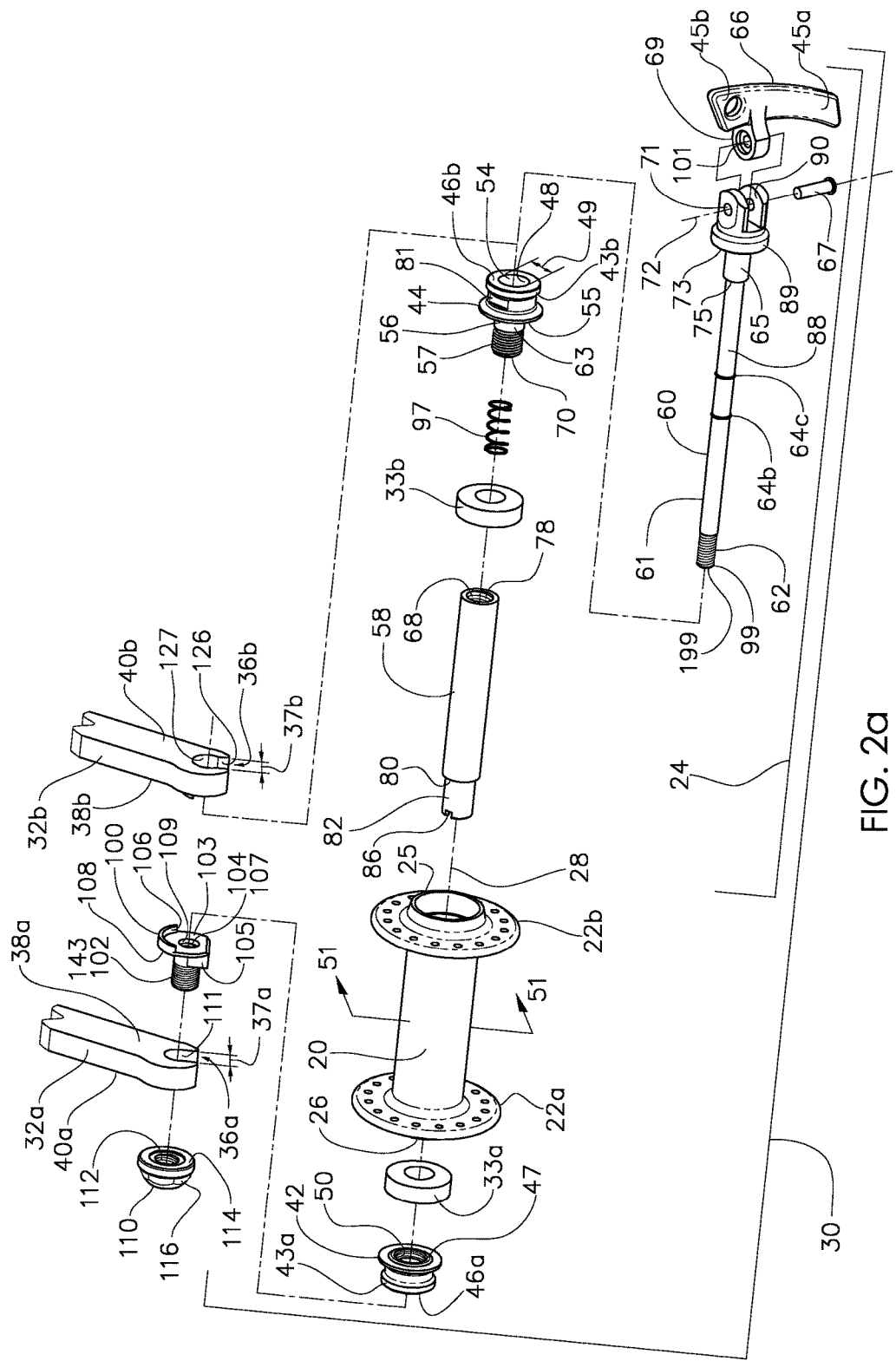

VEHICLE WHEEL AXLE ASSEMBLY

CROSS-REFERENCE TO RELATED APPLICATIONS

This application claims priority of U.S. Provisional Patent Application 62/124,391, filed Dec. 18, 2014 and entitled "VEHICLE HUB ASSEMBLY".

This application is also a Continuation-In-Part of U.S. patent application Ser. No. 14/952,645 filed Mar. 25, 2015 and entitled "VEHICLE WHEEL AXLE ASSEMBLY", which claimed priority of U.S. Provisional Patent Application 62/124,391, filed Dec. 18, 2014 and entitled "VEHICLE HUB ASSEMBLY".

U.S. patent application Ser. No. 14/952,645 is also a Continuation-In-Part of U.S. patent application Ser. No. 14/602,543 filed Jan. 22, 2015 and entitled VEHICLE WHEEL AXLE ASSEMBLY, which claimed priority of U.S. Provisional Patent Application 61/965,201 filed Jan. 27, 2014.

U.S. patent application Ser. No. 14/602,543 is also a Continuation-In-Part of U.S. patent application Ser. No. 13/914,490 filed Jun. 10, 2013 and entitled VEHICLE WHEEL HUB ASSEMBLY, which is issued as U.S. Pat. No. 9,446,626, and which is a Continuation-In-Part of U.S. patent application Ser. No. 12/655,433 filed Dec. 30, 2009 and entitled TORQUE COUPLING ASSEMBLY, which is currently issued as U.S. Pat. No. 8,485,335.

BACKGROUND

Field of the Invention

The present invention relates to a vehicle wheel axle assembly, particularly including aspects that facilitate the connection between axle of a vehicle wheel and the frame to which the vehicle wheel is mounted. More specifically, the present invention relates to a vehicle wheel axle assembly with a threadable connection to the frame that includes a multiple-lead thread engagement. The present invention is particularly applicable to a bicycle wheel axle assembly that facilitates the connection between axle of a bicycle wheel and the frame of a bicycle.

Discussion of Prior Art

Heretofore, the prior art threadable axle assemblies for bicycles and similar vehicles (commonly referred to as "through-axles") employ common single-lead thread engagement between the axle and/or the control shaft to threadably secure the wheel axle to the bicycle frame and/or fork.

It is highly desirable to be able to install and uninstall the bicycle wheel to the frame very quickly and easily. Particularly in bicycle racing conditions, when every second counts, the ability to quickly swap out wheels (in the case of a flat tire, for instance) is critical. Reducing the time required to install and uninstall the wheel may result in the margin of difference between winning and losing the race.

This single lead thread engagement utilizes a thread with only a single thread start. The axle and/or control shaft commonly employs an external (male) thread, while the frame commonly employs a mating internal (female) thread to achieve a threadable engagement therebetween. When the external thread of the axle and/or control shaft is presented to the internal thread of the frame, there is only a single point of initiation (start) of initial engagement that is possible within 360 degrees of rotation. As such, the operator will need to rotate the axle and/or control shaft by up to 360 degrees (i.e. a full revolution) before the axle and/or control shaft initiates the threadable engagement. This full revolution of the axle and/or control shaft results in time-consuming lost motion when installing or uninstalling the wheel to the frame.

Once the operator has initiated this threadable engagement, he/she must next rotate the axle and/or control shaft to advance this threadable engagement to axially overlap the external thread relative to the internal thread to the point where the wheel is secured to the frame. Upon securing the wheel to the frame, it is desirable to have achieved a certain minimum axial thread engagement to insure the alignment and strength of this threadable engagement. This minimum thread engagement is related to several factors as is well known in industry. With a conventional single-lead thread engagement, the axial thread engagement advances by a single thread pitch with each rotation of the axle and/or control shaft. The result is a relatively "slow" threadable advancement, with a corresponding large number of manual "turns" or revolutions of the axle and/or control shaft required for a given axial advancement of the threadable engagement. This large number of revolutions is time-consuming and further adds to the time and motion required to install and/or uninstall the wheel to the frame.

One potential method to increase the "speed" of the threadable engagement and reduce the number of revolutions of the axle and/or control shaft for a given axial advancement of the threadable engagement is to increase the pitch of this single-lead thread. However, an increased pitch commonly corresponds to a thread profile of greater radial depth. This greater thread depth requires the removal a greater amount of material in both the axle and/or control shaft and the mating component of the frame, thus further weakening these elements. While other coarse thread forms may exist, such as the acme thread form, these thread forms are very expensive to produce in comparison with conventional vee-shaped thread forms.

Another potential method to increase the "speed" of the threadable engagement and reduce the number of revolutions of the axle and/or control shaft for a given axial advancement of the threadable engagement is to employ a bayonet-type thread system or a "quarter-turn" rotational fastening system, such as fastener arrangements popularized by Dzus®. Such fasteners utilize a circumferential cam-and-follower engagement where a portion of the cam surface may have a helical ramping geometry that may resemble a helical thread. However, such fasteners have limited range of circumferential or rotary engagement that is less than 360 degrees, hence they are common termed as "quarter turn" fasteners. This is in contrast to conventional thread systems that utilize the threadable engagement of continuous helical thread flanks that commonly engage through at least a full revolution, and most commonly several revolutions. Due to their limited range of circumferential engagement, quarter-turn fasteners also have very limited axial engagement. Further, since their axial range of engagement is commonly axially predetermined and fixed, the axial stack-up tolerances of the fastened components must be held very closely, with tight tolerances that add to cost. Still further, in contrast to conventional helical threads, this cam-and-follower engagement has very limited surface area of contact and severely limited circumferential overlap angle of engagement, which results in high contact stresses and further restricts the axial load bearing capacity of this engagement and the smoothness of the rotational actuation. This circumferential overlap angle of engagement is commonly less than 90 degrees. Due to their significant limitations, such quarter-turn fasteners are commonly employed merely as a key to position and/or retain two components to each other, rather than to threadably clamp and positively secure two components to each other or to provide a structural connection.

Another shortcoming of conventional single-lead threads is that, depending on the pitch of the thread and on the ability to maintain perfect alignment between the axle and/or control shaft relative to the frame, a single-lead thread will have a relatively high propensity for cross-threading during initiation of the threadable engagement. As is well-known in industry, such cross-threading can easily deform and damage the thread form and make it difficult or impossible to later thread these two parts together.

SUMMARY OF THE INVENTION

Objects and Advantages

In accordance with the present invention, it has now been found that the forgoing objects and advantages may be readily obtained.

It is an object of the invention to provide a vehicle wheel axle assembly where the vehicle wheel may be quickly and easily installed and/or uninstalled from the frame to which it is mounted. In the case where the wheel is installed/uninstalled by means of the threadable assembly of the control shaft and/or axle with the frame, it is highly advantageous to reduce the time required to effect this threadable assembly.

It is a further object to reduce the angle of rotation of the control shaft and/or axle required to initiate the threadable engagement. By utilizing a multiple-lead thread, there is a corresponding multiplicity of thread "starts", resulting in a corresponding reduction in the angle of rotation required to initiate (start) the threadable engagement. For example, with a double-lead thread profile, when the external thread of the axle and/or control shaft is presented to the internal thread of the frame, there are two points of initiation (starts) of initial engagement that is possible within 360 degrees of rotation. As such, the operator will only need to rotate the axle and/or control shaft by a maximum of 180 degrees (i.e. a half revolution) before the axle and/or control shaft initiates the threadable engagement. This half revolution of the axle and/or control shaft results saves time-consuming lost motion as compared to the possible full revolution of a single-lead thread, when installing or uninstalling the wheel to the frame. Similarly, a triple-lead thread results in the operator needing to rotate the axle and/or control shaft by a maximum of 120 degrees (i.e. one third of a revolution) before the axle and/or control shaft initiates the threadable engagement. Increasing the number of thread leads further reduces the maximum rotation required to initiate the threadable engagement.

It is a further object to reduce the number of turns of the control shaft and/or axle required to axially advance the threadable engagement to achieve the requisite axial thread engagement. In comparison with a conventional single-lead thread of the same pitch, a multiple-lead thread results in a "faster" thread engagement where the threadable engagement advances by a multiple of the thread pitch with each rotation of the axle and/or control shaft. For example, with a double-lead thread profile, the helix angle of the thread is increased and the number of manual turns of the control shaft and/or axle required to achieve the requisite axial thread engagement is halved in comparison with a conventional single-lead thread engagement of the same pitch. Correspondingly, the amount of time required to achieve this requisite axial thread engagement is also halved, resulting in a further reduction in the time required to install or uninstall the wheel from the frame. Increasing the number of thread leads further increase the "speed" of the thread and increases the axial length of threadable engagement that is advanced with each revolution of the male or female thread.

It is a further object to overcome the shortcomings of bayonet threads and/or quarter-turn type fastening systems. The multiple-lead thread engagements described herein utilize continuous helical thread flanks that have a circumferential angle of engagement greater than 180 degrees, more commonly greater than 360 degrees, and most commonly including several circumferential rotations of continuous contact. In comparison with such quarter-turn-type fastening engagements, the multiple-lead thread engagements have greater surface area of engagement because the mating surfaces are generally perfectly matched, and have much greater circumferential contact overlap. This results in reduced contact stresses and far greater axial load bearing capacity between mating threads. Further, since these multi-lead threads do not have a limited range of circumferential engagement, their corresponding range of axial engagement (i.e. axial travel of the thread engagement) may be as broad as required. This allows the multiple-lead threads to accommodate a relatively broad range of axial thickness of the components being fastened, thereby reducing tolerance requirements and reducing manufacturing costs. This also permits axial over-travel of the threadable engagement to insure that the components to be fastened may be securely clamped together. These advantages resulting in a firm and structural connection these components that far exceeds the structural capability of these quarter-turn type fasteners.

It is a further object to minimize the possibility of cross-threading and resulting thread damage. Due to its multiple starts and its steeper helix angle, a multiple-lead thread engagement has a significantly lower propensity for cross-threading in comparison with a conventional single-lead thread engagement of the same pitch. This is because the multiple-lead thread advances much faster than a single-lead thread, thus providing less opportunity for cross threading. This is also because the multiple starts of a multiple-lead thread result in multiple simultaneous thread engagements circumferentially spaced around the axial axis. For example, with a double lead thread, upon threadable initiation, the two starts of the thread are circumferentially opposed across the diameter of the axle and/or control shaft. Thus, the thread engagement "grabs" or engages at two opposed locations, which force the threadable engagement into alignment immediately upon initiation. In contrast a single-lead thread has only one (circumferentially unbalanced) single start at a single circumferential location, which permits a window of opportunity where the thread may be easily misaligned until a certain minimum thread engagement is achieved (usually corresponding to at least one full revolution or turn of threadable engagement).

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2a is an exploded perspective view of a first embodiment of the present invention, showing the dropouts of the bicycle frame and a hub assembly, including a control shaft assembly;

FIG. 2c shows the adapter and nut assembled to one dropout and the hub assembly axially aligned in preparation for assembly with the dropouts, and with the control shaft in the retracted position;

FIG. 2d shows the hub assembly positioned between the dropouts, with each axlecap radially nested within its respective adapter and slot, and with the control shaft still in the retracted position;

FIG. 2e shows the hub assembly positioned between the dropouts, with the control shaft axially extended and threadably engaged with the adapter in the engaged position to secure the hub assembly to the dropouts;

FIG. 2f shows the hub assembly as positioned in FIG. 2e, with the handle pivotally folded;

FIG. 2g shows the hub assembly positioned between the dropouts, with the control shaft axially retained in the retracted position, corresponding to the assembly sequence described in FIG. 2d;

FIG. 2h shows the hub assembly positioned between the dropouts, with the control shaft in the pre-engaged position such that it is axially released and advanced toward the extended orientation, corresponding to an intermediate assembly sequence between FIGS. 2d and 2e;

FIG. 2i shows the hub assembly positioned between the dropouts, with the control shaft in an engaged position such that it is axially extended and threadably engaged with the dropout adapter, and with the handle pivotally folded, corresponding to the assembly sequence described in FIG. 2f;

FIG. 3b is a perspective view of the right dropout of the embodiment of FIG. 3a;

DETAILED DESCRIPTION OF THE INVENTION

Figure 1:
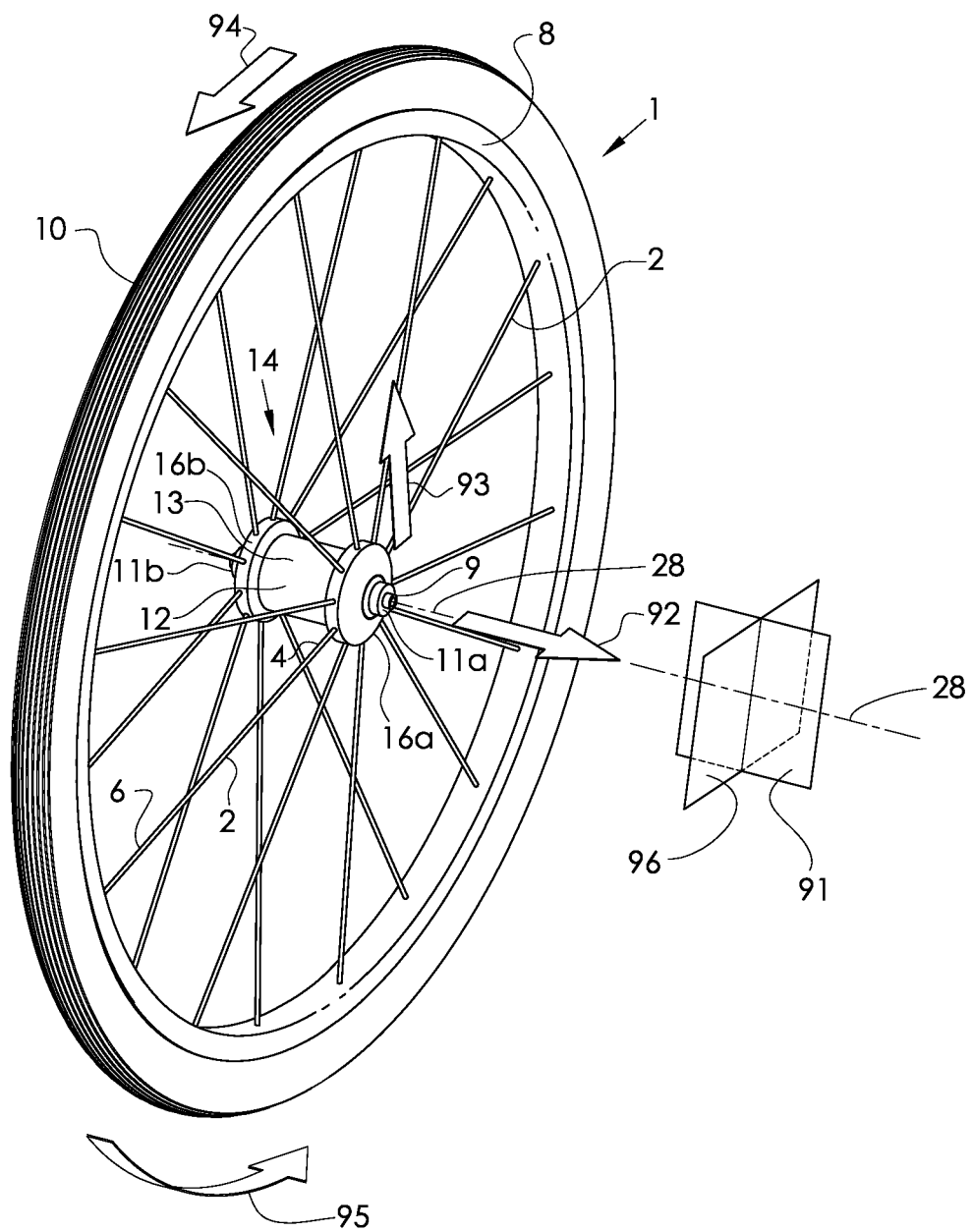
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 22a and 22b may be contiguous with the hub shell 12 or may be separately formed and assembled to the hub body 13 portion of the hub shell 12. The spokes 2 are affixed to the hub flanges 22a or 22b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

For general definition purposes herein, an "integral" joinder or assembly is one that is integrated and may not be easily disassembled at the service temperature without damaging at least one of the components that are joined, or is difficult to disassemble, or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular element.

Figure 2B:
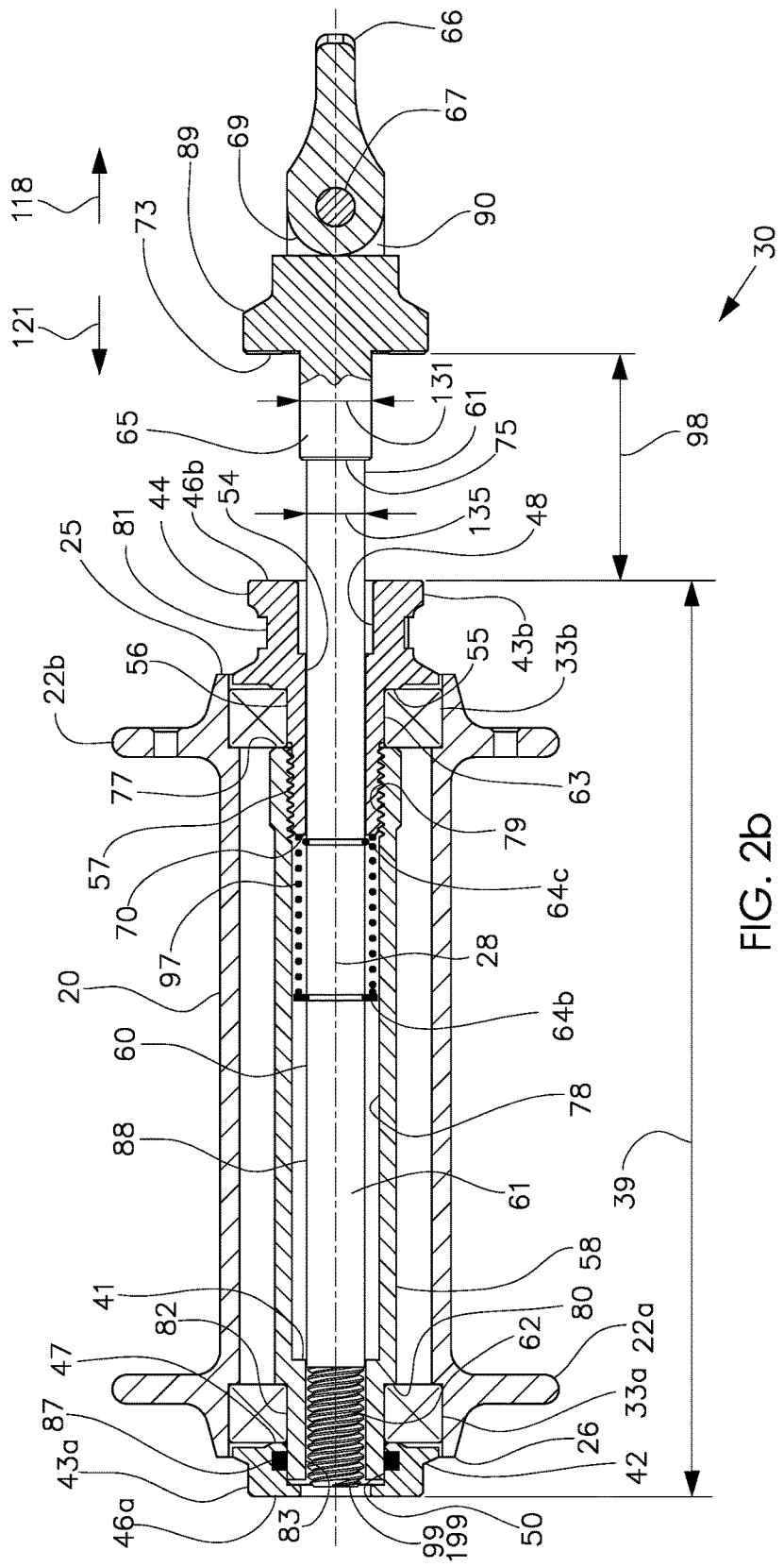
FIG. 2b is an axial cross-sectional view taken along 51-51 of the hub assembly of the embodiment of FIG. 2a, with the control shaft axially retained with the sleeve and positioned in the axially retracted position.
Figure 2C:
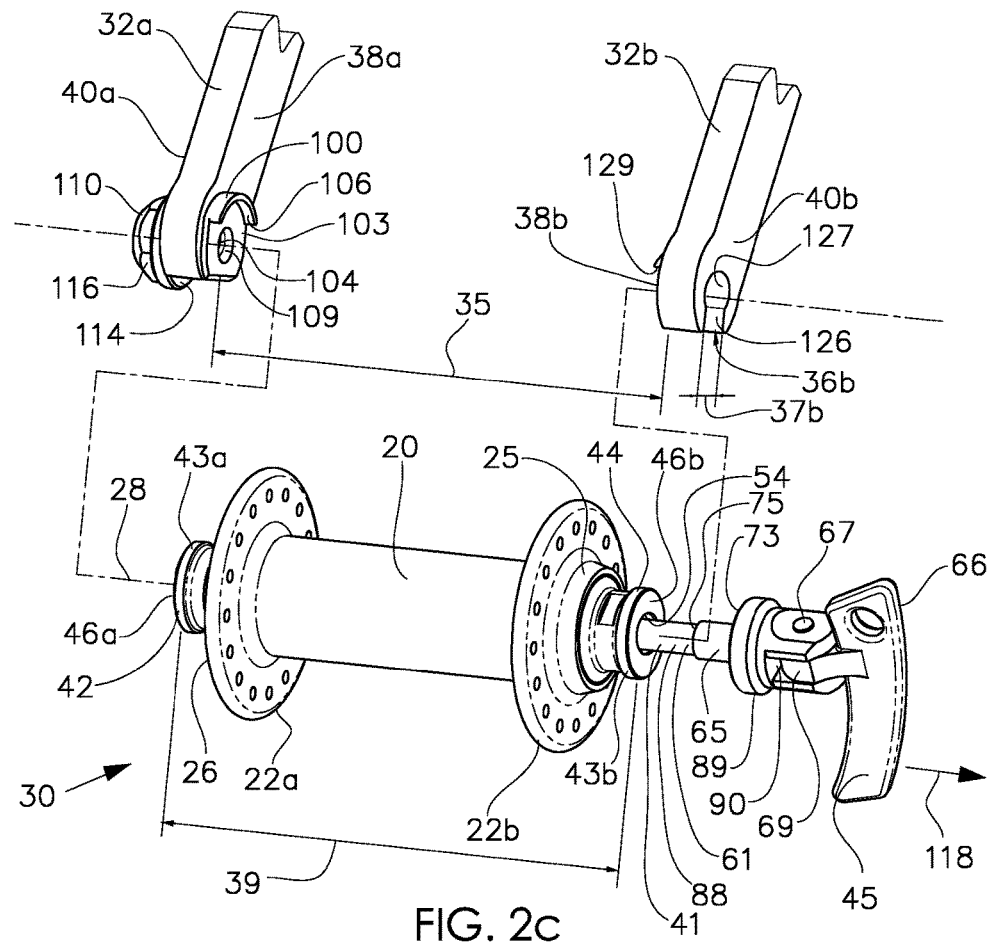
FIGS. 2c-f are perspective views of the embodiment of FIG. 2a, showing the progressive sequential assembly steps involved in assembling the hub assembly to the dropouts.
Figure 2D:
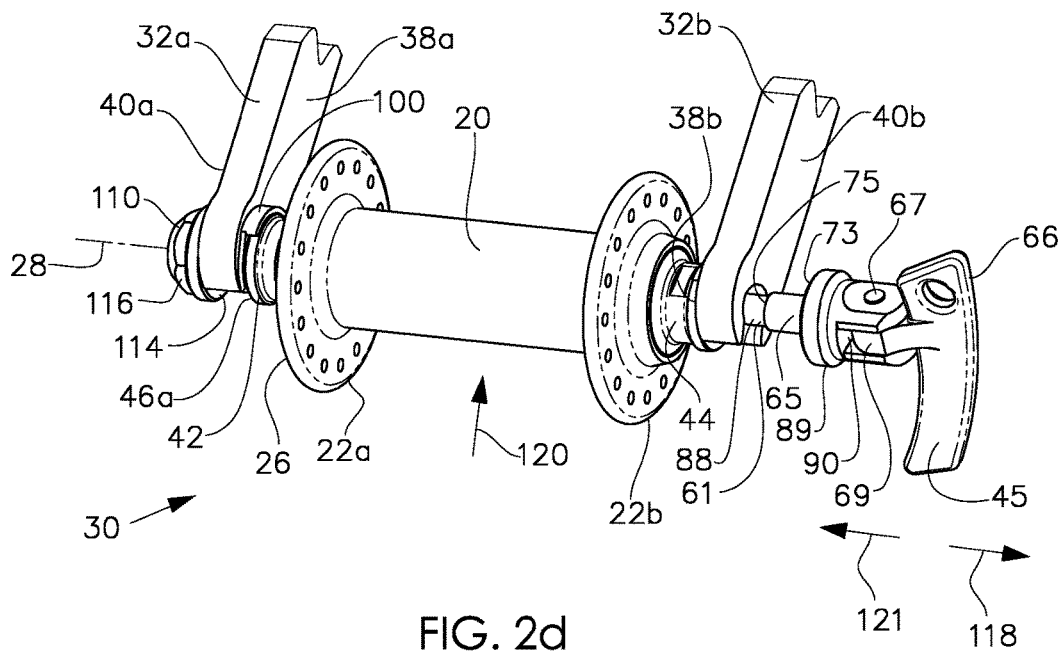
Figure 2E:
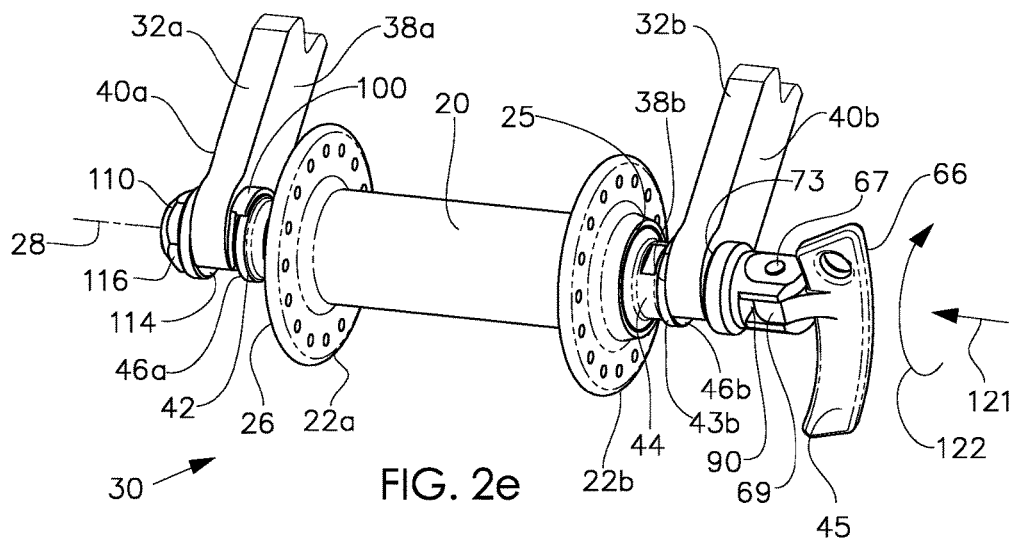
Figure 2F:
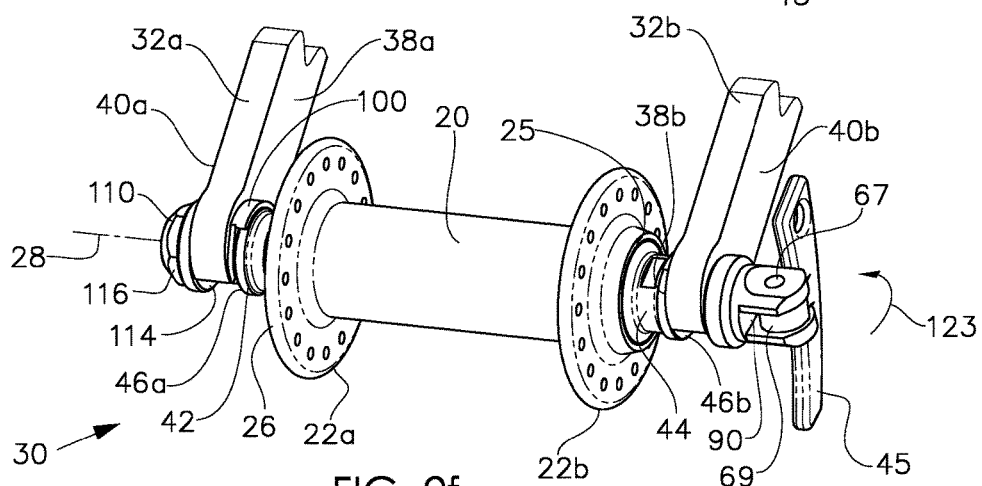
Figure 2G:
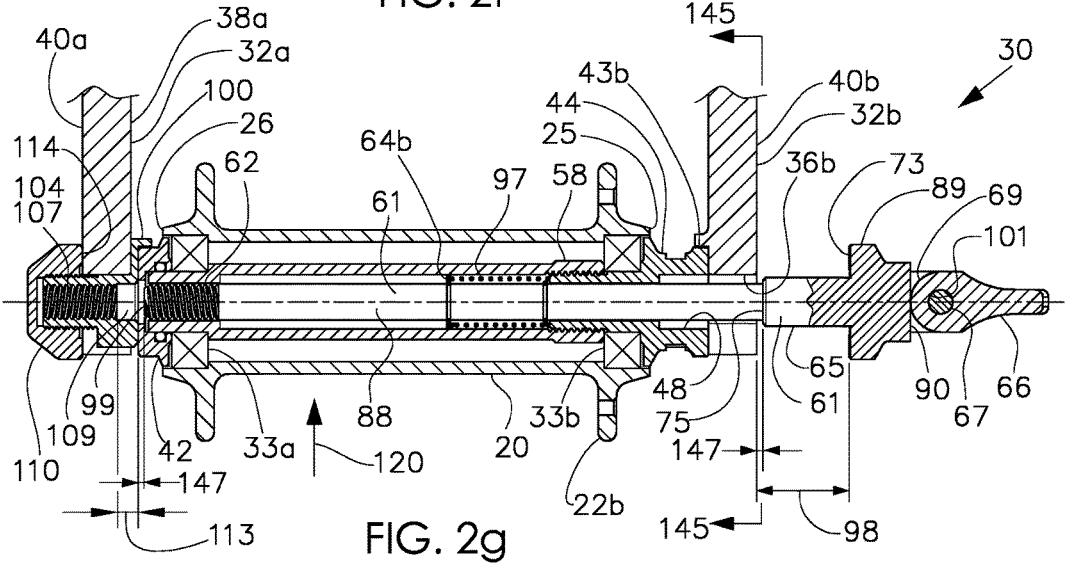
FIGS. 2g-i are axial cross-sectional views taken along 51-51 of the embodiment of FIG. 2a, showing the progressive sequential steps involved in assembling the hub assembly to the dropouts.
Figure 2H:
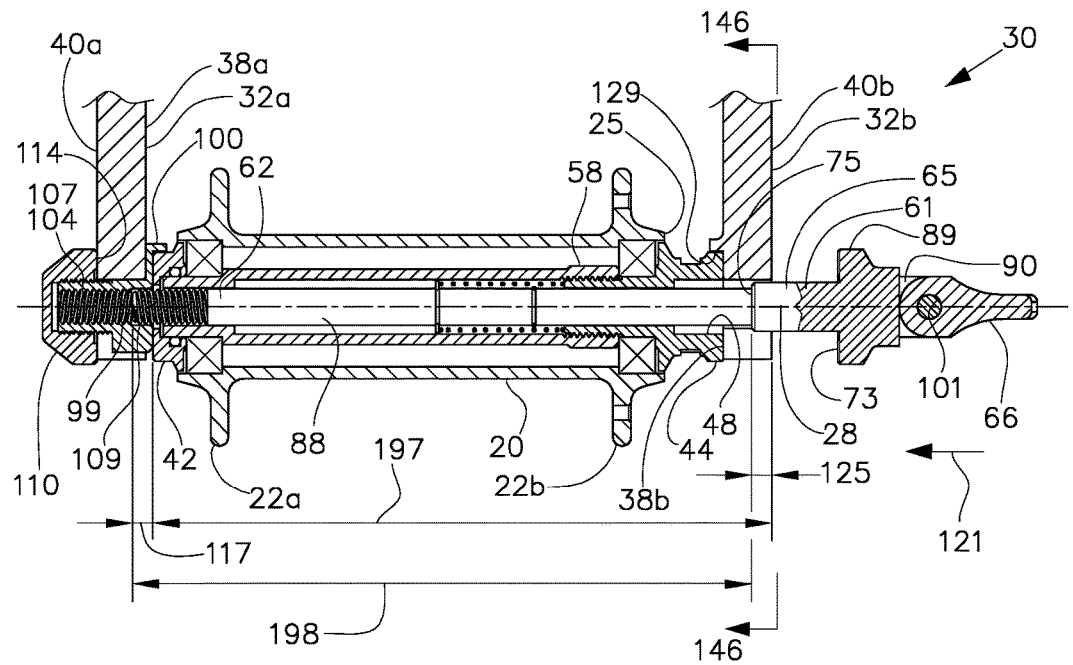
Figure 2I:
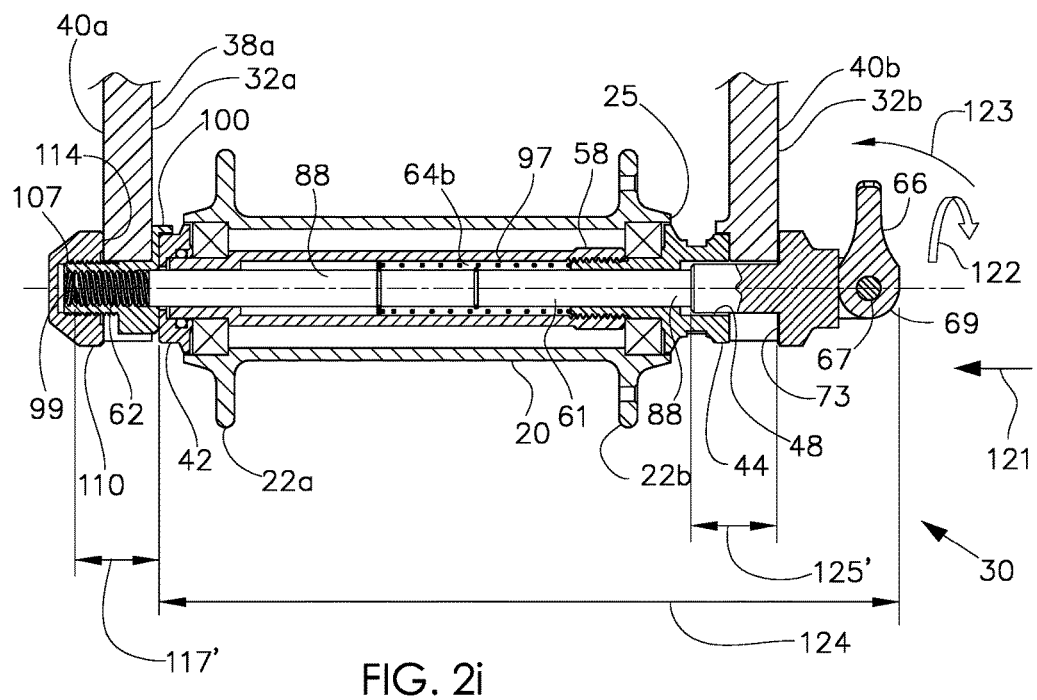
Figure 2J:
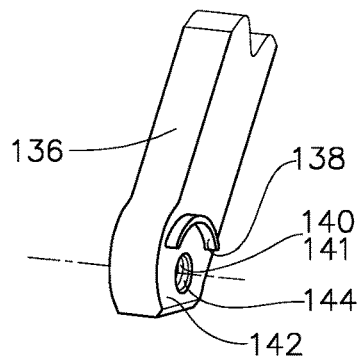
FIG. 2j is a perspective view of an alternate (left) dropout corresponding to the view of FIG. 2a, where the adapter and nut are eliminated in favor of an alternate dropout configuration that includes geometry otherwise associated with the adapter, including the alignment surface and internally threaded hole.
Figure 2K:
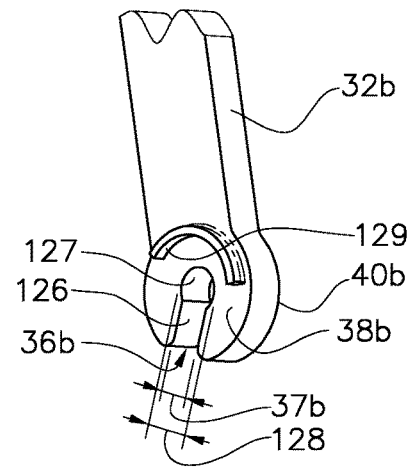
FIG. 2k is a perspective view of the right dropout of the embodiment of FIG. 2g, detailing the open keyhole dropout slot.
Figure 2L:
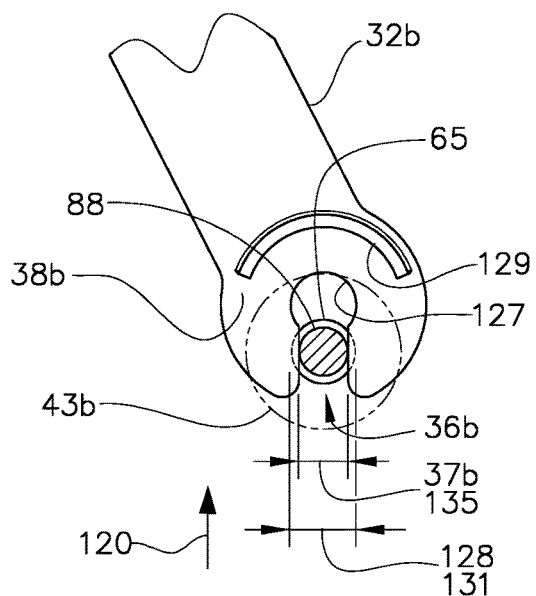
FIG. 2L is a partial cross section view of the embodiment of FIG. 2g, taken along 145-145, detailing the interaction between the control shaft and the right dropout, and corresponding to the transition between the assembly sequence of FIG. 2c and the assembly sequence of 2d (and 2g), with the shank portion of the control shaft passing within the necked entrance region of the keyhole slot.
Figure 2M:
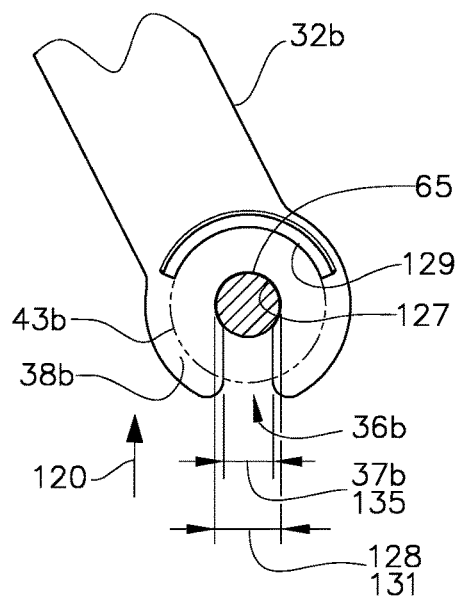
FIG. 2m is a partial cross section view of the embodiment of FIG. 2h, taken along 146-146, corresponding to the assembly sequence of FIG. 2e, FIG. 2f, FIG. 2h, and FIG. 2i, with the control shaft axially advanced toward the engagement position such that the stepped portion is positioned within the pilot region of the keyhole slot.
Figure 2N:
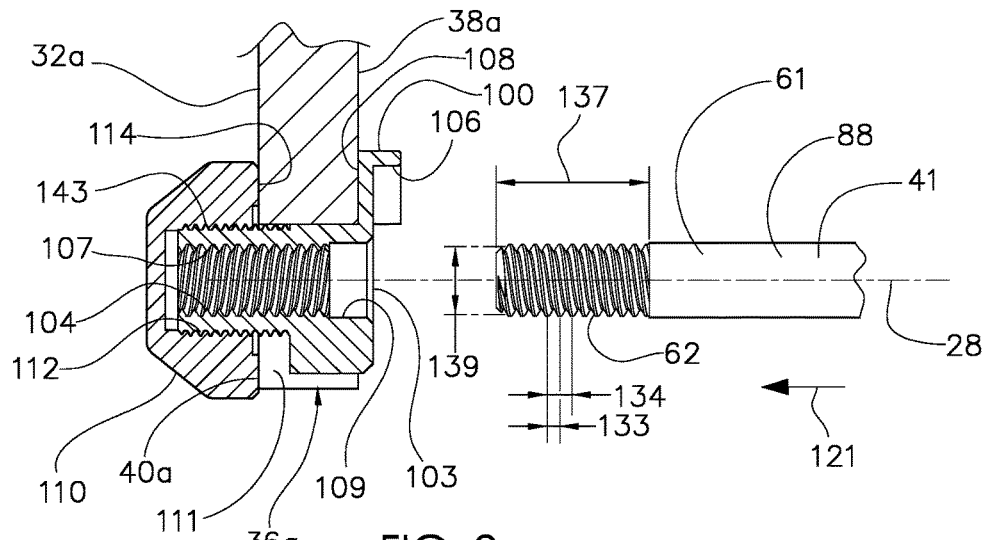
FIG. 2n is a partial cross sectional detail view of the embodiment of FIG. 2a, corresponding to the retracted position of FIGS. 2d and 2g, showing the counterbore of the adapter and the control shaft in greater detail, including description of the multiple-lead thread.

FIGS. 2a-n describe an embodiment of the present invention with a threaded engagement between a control shaft of a hub assembly 30 and the dropout of the frame. This threaded engagement includes a multiple-lead thread engagement. In this embodiment, the frame includes an open-slotted dropout axially opposed to this threaded engagement, for quick and easy wheel removal. FIG. 2a is an exploded view, showing the individual components of this embodiment.

Referring to FIGS. 2a-n, dropouts 32a (and 136) (left dropout) and 32b (right dropout) may be considered mounting portions of the bicycle (not shown) and constitute the portion of the frame (not shown) to which the hub assembly 30 is mounted or connected. Left dropout 32a is of a generally conventional design and includes an open slot 36a of slot width 37a between sidewalls 111, an axially inboard face 38a, and an axially outboard face 40a. Right dropout 32b, as also shown in FIG. 2k, includes an open keyhole slot 36b that is radially stepped to include a narrower necked entrance region 126 of radial width 37b and a wider enlarged circular pilot region 127 of radial width 128. This radial step occurs within the axial region between inboard face 38b and outboard face 40b. Dropout 32b also includes an axially inboard face 38b, and an axially outboard face 40b. Inboard face 38b also includes an axially inwardly projecting alignment face 129 to provide radial positioning location of the alignment surface 43b of axlecap 44. Open keyhole slot 36b has a radially extending open entrance to receive the control shaft assembly 60.

Inboard faces 38a and 38b are axially opposed and face each other, while outboard faces 40a and 40b are axially opposed and face away from each other. Width 37a between sidewalls 111 of open slot 36a is sized to receive flats 105 of adapter 100. Width 37b of the necked entrance region 126 of open slot 36b is sized to receive the shank portion 88 of the control shaft 61 and width 128 (shown in FIG. 2k) of the pilot region 127 is sized to receive stepped portion 65. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes an axle assembly 24 (and also including axlecap 42), bearing assemblies 33a and 33b, and hub shell 20. In this case, the axle assembly 24 is generally stationary and fixed to the frame of the bicycle, while the hub shell 20 is rotatable about axial axis 28 and about the axle assembly 24 by means of bearing assemblies 33a and 33b. Bearing assemblies 33a and 33b are shown here as conventional "cartridge" type bearing assemblies, including rolling elements, an inner race and an outer race. The hub shell 20 includes two hub flanges 22a and 22b that are adapted to connect with the first ends of spokes (not shown) in the conventional manner. Hub shell 20 includes a second end portion 25 axially disposed to be proximal to handle 66 of the control shaft assembly 60 and to outer face 46b, and a first end portion 26 axially disposed to be distal the handle 66 relative to the second end portion 25 and to be axially proximal outer face 46a. The axle assembly 24 includes axlecap 42, axlecap 44, sleeve 58, and control shaft assembly 60. The control shaft assembly 60 includes the control shaft 61 with spring 97, snaprings 64b and 64c, handle 66, and pivot pin 67. The handle 66 includes radially projecting lever portions 45a and 45b to afford additional tightening torque and leverage when the handle 66 is manipulated by the operator. The handle 66 also includes a pivot tab 69 with a hole 101 therethrough. The sleeve 58 includes an axial opening 78 therethrough with a shoulder 41, and with internal threads 79. Sleeve 58 also includes end face 77, shoulder 80, collar 82, and hole 83 that is sized to accept and preferably to pilot the control shaft 61.

Concentric and coaxial within the sleeve 58 is the control shaft 61, which is both (axially) slidable and rotatable within the sleeve 58 about the axial axis 28. Control shaft 61 includes a shank portion 88 and an enlarged head portion 89, with a grip face 73 serving as a transition surface between shank portion 88 and head portion 89. The shank portion 88 extends axially inwardly from the grip face 73 and includes a cylindrical stepped portion 65 of larger diameter 131 and a shank portion 88 that is concentric with stepped portion 65 and is of smaller diameter 135 such that there is a step or transition surface 75 therebetween. The shank portion 88 may be considered as a radially relieved surface relative to the stepped portion 65 and the stepped portion 65 may be considered as a radially enlarged surface relative to the shank portion 88. The shank portion 88 includes end face 199, and external threads 62 at its engagement end adjacent end portion 99. End face 199 and transition surface 75, which correspond to first and second leading engagement edges of the control shaft 61 respectively, are axially separated by engagement distance 198. The head portion 89, including grip face 73, extends axially outwardly from the grip face 73 and includes a slot 90 to accept the pivot tab 69 of the handle 66, and a cross hole 71 sized to accept the pivot pin 67. Control shaft 61 extends through axlecaps 42 and 44 and sleeve 58 and includes end portion 99 with external threads 62 at its engagement end. Control shaft 61 further includes snaprings 64b and 64c, each nested and engaged in corresponding circumferential snapring grooves, at specific axial locations along its length. Snapring 64b provides an axial end stop for compression spring 97, which is positioned between snapring 64b and end face 70, and which serves to axially bias the control shaft assembly 60 in direction 121 relative to the sleeve 58. Snapring 64c serves to provide an axial travel limit stop for the control shaft assembly 60 relative to the axlecap 44 and to retain the control shaft assembly 60 to the rest of the hub assembly 30.

Axlecap 44 includes outer face 46b, shoulder 55, counterbore 48, collar portion 56, cylindrical alignment surface 43b, end face 70, and an axially extending hole 54 therethrough. Axlecap 44 also includes flats 81 for rotational manipulation with a wrench (not shown). Collar portion 56 includes a threaded portion with external threads 57 to mate with internal threads 68 of the sleeve 58 and a smooth cylindrical portion 63 to pilot the inside diameter of bearing 33b. The diameter 49 of counterbore 48 is sized to receive stepped portion 65.

Axlecap 42 includes end face 46a, face 47, cylindrical alignment surface 43a, and an axially extending hole 50 sized to accept collar 82. Outer faces 46a and 46b are generally axially opposed and face away from each other and preferably have a fixed axial distance 39. Holes 50 and 54 constitute the exposed openings of a continuous axial hole that extends through the sleeve 58 to accept the control shaft 61.

Adapter 100 is also detailed in FIG. 2n and includes externally threaded collar 102, flats 105, hole 104, shoulder 108, end face 103, and a concave alignment surface 106. Collar includes external threads 143 for threadable assembly with nut 110. Hole 104 includes a counterbore 109 portion that extends axially from end face 103 through a portion of hole 104 by depth 113 (FIG. 2G), and is of a diameter sized to accept the major diameter of external threads 62 of the control shaft 61. Hole 104 also includes an internally threaded portion with internal threads 107 extending axially from the base of the counterbore 109 axially outwardly through the remainder of the collar 102. Internal threads 107 are sized to threadably mate with external threads 62 of the control shaft 61. Flats 105 create a noncircular profile and are sized to engage and key with the sidewalls 111 of slot 36a and serve to prevent the adapter 100 from rotating about the axial axis 28. Flats 105 also serve to prevent the adapter 100 from rotating relative to the nut 110 during assembly with dropout 32a and also to maintain the desired orientation (about the axial axis 28) of the adapter 100. The engagement between flats 105 and slot 36a also serve to maintain the proper alignment of the adapter 100 about the axial axis 28. Nut 110 includes internally threaded hole 112, end face 114, and flats 116.

The adapter 100 is first pre-assembled to dropout 32b such that collar 102 and flats 105 are nested within slot 36a to extend therethrough, with shoulder 108 axially abutting inboard face 38a. Flats 105 are aligned and keyed with sidewalls 111 of the slot 36a. Nut 110 is then threaded onto adapter 100 with internal threads 143 of hole 112 threadably mated to external threads of collar 102, such that end face 114 is axially abutting outboard face 40a. The nut 110 is then further threadably tightened against the adapter 100, by means of a wrench (not shown) engaged to flats 116 to sandwich, clamp, and grip the dropout 32a, with end face 114 bearing and gripping against outboard face 40a and shoulder 108 bearing and gripping against inboard face 38a. The keyed engagement between flats 105 and sidewalls 111 prevents the adapter 100 from rotating while the nut 110 is tightened and also maintains the desired alignment of the adapter 100 relative to the dropout 32a, insuring that other features, such as the alignment surface 106, is in proper alignment to receive the hub assembly 30. This rotatably fixed engagement also insures that the adapter 100 will not spin about the axial axis 28 when the external threads 62 are threadably mated with internal threads 107. End face 103 is axially spaced from inboard face 38b by frame spacing distance 35 that corresponds to the axial hub spacing distance 39 between outer faces 46a and 46b.

As shown in FIG. 2b, which details the hub assembly 30 and corresponds to the retracted position of the control shaft assembly 60, shoulder 80 axially abuts the inner race of bearing assembly 33a and end face 77 axially abuts the inner race of bearing assembly 33b. Outer races of bearing assemblies 33a and 33b are radially and axially fixed in the hub shell 20 in the conventional manner as shown. Thus, sleeve 58 is axially fixed relative to the hub shell 20, with the hub shell 20 rotatable about the sleeve 58 via bearings 33a and 33b about the axial axis 28. Axlecap 44 is threadably assembled to the sleeve 58 as shown, with external threads 57 mated to internal threads 79 and with shoulder 55 axially abutting the inner race of bearing assembly 33b. End face 77 and shoulder 55 serve to axially sandwich and locate the inner race of bearing assembly 33b. Collar portion 56 extends through the inner race of bearing assembly 33b. Similarly, collar 82 extends through the inner race of bearing 33a and within hole 50 to also pilot the axle cap 42. Shoulder 80 and face 47 serve to axially sandwich and locate the inner bearing race of bearing assembly 33a. The opening 78 of sleeve 58 is stepped from a larger diameter adjacent the end face 77 for clearance with spring 97 to the smaller diameter of hole 83 adjacent the collar 82 for radial piloting of the control shaft 61. Sleeve 58 also includes notches 86 at the engagement end for rotational manipulation with a mating wrench (not shown) about the axial axis 28. The assembled axle assembly 24 preferably provides a fixed axial distance between outer faces 46a and 46b as is conventional.

Snapring 64c provides an axial displacement limit stop relative to the axle assembly 24. In the case where the control shaft assembly 60 is withdrawn too far in direction 118, the snapring 64c will abut end face 70 and limit its travel. As such, snapring 64c also serves to insure that the control shaft 61 is positively retained with the axle assembly 24, serving as a convenience to prevent the control shaft assembly 60 from becoming separated from the hub assembly 30. The control shaft 61 also includes head portion 89 with grip face 73, slot 90, and cross hole 71. The pivot tab 69 of the handle 66 is assembled to the head portion 89 by first inserting pivot tab 69 into slot 90 and then inserting pivot pin 67 through cross hole 71 such that the handle 66 is engaged to the head portion 89 in a clevis hinge arrangement. The handle 66 may now be pivoted about the pivot axis 72 relative to the control shaft 61.

For explanation purposes and referring to FIGS. 2a-b, it is understood that an orientation described as "clamp end" or "handle end" refers to an axial location proximal to the handle 66 and distal the end portion 99. Conversely, an orientation described as "toward the engagement end" or "engagement end" refers to an axial location proximal to the end portion 99 and distal the handle 66. The handle end may also be termed the "control end".

FIG. 2b shows the assembled hub assembly 30, with the handle 66 assembled to the control shaft 61 by means of pin 67. The handle 66 is shown to be pivoted to its open or unfolded position to facilitate its manual manipulation. Control shaft 61 is extending through hole 54 and with spring 97 constrained between end face 70 and snapring 64b. Axlecap 44 is threadably assembled to the sleeve 58 as described above. This threadable assembly may be tightened with the aid of wrenches (not shown) engaged with flats 81 and with notches 86 to axially sandwich the inner race of bearing assembly 33b. A portion of collar 82 protrudes through bearing 33a to axially overlap and radially pilot the hole 50 of axlecap 42, with o-ring 87 providing a frictionally gripped retaining means therebetween in the conventional manner.

The compression spring 97 surrounds the control shaft 61, with its ends constrained and abutting the snapring 64b of the control shaft 61 and the end face 70 of the axlecap 44. With the control shaft assembly 60 in the retracted position, as shown in FIGS. 2b-c, the compression spring 97 is axially compressed and pre-loaded to provide a bias force to axially shuttle the control shaft assembly 60 in direction 121 towards its extended position as shown in FIGS. 2e and 2i. The term "axial shuttle" refers to an axial displacement that may or may not include rotation about the axial axis 28.

The control shaft 61 is shown in FIGS. 2b-c to be in the axially retracted position relative to the sleeve 58 and axle assembly 24. The control shaft assembly 60 has been axially withdrawn toward the handle end in direction 118 (the "retracted direction") until snapring 64c contacts the end face 70. This retracted position causes the spring 97 to be compressed to axially bias the control shaft assembly 60 in direction 121. In this retracted position, the axial gap 98 between outer face 46b and grip face 73 is considered "open" and there is axial clearance 147 (shown in FIG. 2g) between outboard face 40b and transition surface 75 adjacent the handle end. Additionally, in this retracted position, the end face 199 of the control shaft 61 may be flush or slightly axially inwardly recessed by recess distance 148 relative to the outer face 46a as shown. It is preferred that axial clearance 147 is equal or close to the recess distance 148 so that the end portion 99 is axially disengaged from the counterbore 109 by the same or similar amount as the transition surface 75 is disengaged from the pilot region 127.

FIG. 2c shows adapter 100 and nut 110 as firmly assembled to grip the left dropout 32a as described hereinabove. Once firmly secured to the dropout 32a, the adapter 100 may be considered as an extension of the dropout 32a. The hub assembly 30 is shown positioned prior to its assembly with the dropout 32b and adapter 100. The handle 66 is in its unfolded and open position. The operator has pulled the handle 66 in direction 118 to insure that the control shaft assembly 60 is in the retracted position, with gap 98 open and expanded and with the end portion 99 (i.e. engagement end) of the control shaft assembly 60 recessed from outer face 46a. The transition surface 75 is preferably axially aligned to be axially coincident or axially outboard of the outer face 40b such that the shank portion 88 is axially aligned with open slot 36b. Outer face 46a is also generally axially aligned with end face 103 and outer face 46b is generally axially aligned with inboard face 38b. The handle 66 serves to provide geometry for the operator to easily manipulate and control the control shaft assembly 60 as described herein. As a convenience and to prevent the operator from retracting the control shaft assembly 60 too far in direction 118, snapring 64c is provided to bear against the end face 70 of the axlecap 44 as a positive axial travel limit stop. It is noted that, as shown in FIGS. 2a-n, the control shaft assembly 60 is axially retained and engaged to the hub assembly 30 such that the control shaft assembly 60 may not be inadvertently removed from the hub assembly 30.

Next, as shown in FIGS. 2d and 2g, the hub assembly 30 is moved in the generally radial direction 120 relative to the dropouts 32a and 32b such that alignment surface 43a is radially abutting and nested with alignment surface 106 and alignment surface 43b is radially abutting and nested with alignment surface 129 to provide radial alignment between the hub assembly 30 and dropouts 32a and 32b. These nested engagements serve to provide a radial depth stop of the hub assembly 30 relative to the dropouts 32a and 32b in the conventional manner. Outer face 46a is also adjoining end face 103 while outer face 46b is also adjoining inboard face 38b to provide axial alignment between the hub assembly 30 and dropouts 32a and 32b. The external threads 62 are now radially aligned with counterbore 109 and the stepped portion 65 is now radially aligned with pilot region 127.

The radially position engagement between alignment surfaces 43a and 43b and respective alignment surfaces 106 and 129 is provided as a convenience to center and radially pre-align the control shaft 61 with hole 104 and pilot portion 127 respectively. This pre-alignment may serve to permit the smooth and unrestricted axial shuttling and circumferential rotation of the control shaft 61 during the assembly and disassembly of the hub assembly 30 with the dropouts 32a and 32b as described herein. Alternatively, other geometries and/or arrangements may be utilized to provide this radial pre-alignment. In the absence of such a pre-alignment engagement, the control shaft may bear directly against the dropouts 32a and 32b, which may result in binding and friction therebetween, which could impede the smooth and unrestricted axial shuttling and circumferential rotation of the control shaft 61.

The handle 66 serves to provide geometry for the operator to easily manipulate and control the control shaft assembly 60 as described herein. As a convenience and to prevent the operator from retracting the control shaft assembly 60 too far in direction 118, snapring 64c is provided to bear against the end face 70 of the axlecap 44 as a positive axial travel limit stop. It is noted that, as shown in FIGS. 2a-n, the control shaft assembly 60 is axially retained and engaged to the hub assembly 30 such that the control shaft assembly 60 may not be inadvertently removed from the hub assembly 30.

Next, as shown in FIG. 2h, the operator has manually released the handle 66, allowing the spring 97 to linearly displace and shuttle the control shaft assembly 60 in direction 121 (the "extending direction") to advance the control shaft assembly 60 into the "pre-engaged position" such that the end portion 99 and end face 199 is now protruding axially outwardly from outer face 46a to axially overlap counterbore 109 by overlap distance 117. Counterbore 109 circumscribes end portion 99 such that end portion 99 is radially retained and engaged with the left dropout 32a. Simultaneously, in this pre-engaged position, the transition surface 75 and a portion of the stepped portion 65 is now axially overlapping the pilot region 127 by overlap distance 125. Collar portion 65 is now radially retained and engaged with the dropout 32b. It may be considered that counterbore 109 and pilot region 127 both include retaining surfaces that serve to radially retain the hub assembly 30 to the dropouts 32a and 32b. It may also be considered that end portion 99 and collar portion 65 may both be considered as having engagement surfaces that serve to radially engage with their respective mating retaining surfaces. End portion 99 and stepped portion 65 may be considered as engagement surfaces of the control shaft 61 whose leading edges (end face 199 and transition surface 75) are axially spaced corresponding to distance 198. As the control shaft 61 is axially shuttled, both of these engagement surfaces are simultaneously shuttled.

As the control shaft assembly 60 is axially shuttled as described, it may be preferable that this axial overlap 117 of end portion 99 be generally equal to the axial overlap 125 of the transition surface 75 so that both of these radial engagements are initiated generally simultaneously during this assembly sequence described herein. This also insures that these two radial engagements will release generally simultaneously during disassembly of the hub assembly 30 from the dropouts 32a and 32b Similarly, it may be preferable that spacing distance 197 is equal to or nearly equal to engagement distance 198 such that, as control shaft 60 is axially shuttled in direction 121, the radial overlie engagements between end portion 99 and counterbore 109 and between collar portion 65 and pilot region 127 are initiated simultaneously or nearly simultaneously.

Due to tolerances and design restrictions, it may not be possible to insure that distances 117 and 125 are absolutely equal. However, if distances 117 and 125 are within 3 millimeters or, more preferably, within 1 millimeter of each other, the control shaft assembly 60 will still be considered to have simultaneous radial engagement initiation and simultaneous radial release initiation from dropouts 32a and 32b. By coordinating and axially "timing" these two axial overlap distances 117 and 125, the radial engagement of both the handle end and the engagement end will initiate simultaneously as the control shaft assembly 60 is axially shuttled in direction 121. This reduces the possibility that the hub assembly 30 will not hang up or become misaligned as it is installed and/or removed from the dropouts 32a and 32b.

This simultaneous initiation of both of these overlie engagements causes both the control end and handle end of the control shaft assembly 60 to be optimally radially piloted and pre-engaged so that, once the pre-engagement position is initiated (by simply manually releasing the spring-loaded control shaft assembly 60), the control shaft 61 maintains its coaxial alignment such that the external threads 62 are properly aligned with internal threads 107 and the stepped portion 65 is properly aligned with the pilot region 127. Further, these two overlie engagements, which are also maintained and supported by the axial preload provided by the spring 97, provide a significant safety feature and insure that the hub assembly 30 will not become inadvertently separated or dislodged from the dropouts 32a and 32b, even if the threadable engagement between internal threads 109 and external threads 62 is not initiated. Also, outer faces 46a and 46b are now closely located between end face 103 and inboard face 38b for axial engagement between the hub assembly 30 and the dropouts 32a and 32b. The hub assembly 30 is thus also loosely retained to the dropouts 32a and 32b.

If the axial overlap 117 is significantly greater than the axial overlap 125, then the radial overlie engagement between the end portion 99 and the counterbore 109 will be axially initiated prior to the radial overlie engagement between the stepped portion 65 and the pilot region 127. Thus, during this instant, the handle end of the control shaft assembly 60 is not radially retained and may be radially displaced and offset while the end portion 99 remains radially piloted and aligned within the counterbore 109. This may allow the control shaft assembly 60 to become cocked and misaligned such that the threaded engagement between external threads 62 and internal threads 107 may also be misaligned, causing cross-threading and/or damage to the control shaft 61 and/or the adapter 100. Further, with only one overlie engagement, the safety benefit of the pre-engagement is significantly compromised and possibly defeated. Similarly, if the axial overlap 125 is significantly greater than the axial overlap 117, then the radial overlie engagement between the stepped portion 65 and the pilot region 127 will be axially initiated prior to the radial overlie engagement between the end portion 99 and the counterbore 109. Thus, during this instant, the end portion 99 of the control shaft assembly 60 is not radially retained and may be radially displaced and offset while the stepped portion 65 remains radially piloted and aligned within the pilot region 127. This may allow the control shaft assembly 60 to become cocked and misaligned such that the stepped portion 65 may bind against the pilot region 127, adversely affecting the easy assembly of the hub assembly 30 with the dropouts 32a and 32b and possibly damaging the control shaft 61 and/or dropout 32b.

Next, as shown in FIG. 2e, the operator may then manually rotate the handle 66 in direction 122, which serves to threadbly engage external threads 62 with internal threads 107 and also to advance the control shaft assembly 60 further in direction 121, serving to reduce gap 98 until grip face 73 axially abuts outboard face 40b. Outer face 46a is abutting end face 103 and outer face 46b is abutting inboard face 38b and the control shaft assembly 60 is in the engaged position. With the handle 66 in the open position as shown, the lever portions 45a and 45b may function as the "wings" of a wingnut to provide coupled manual leverage amplification for rotation of the control shaft assembly 60 about the axial axis 28. Further threadable tightening of the handle 66 in direction 122 serves to axially draw end face 103 toward grip face 73, thereby firmly clamping dropout 32b between grip face 73 and outer face 46b and firmly clamping outer face 46a against end face 103. The end portion 99 is now fully axially overlapping the adapter 100 and the stepped portion 65 is now fully axially overlapping the dropout 32b to more positively radially retain the hub assembly 30 to the dropouts 32a and 32b. With the handle 66 fully tightened as described above, the hub assembly 30 is now in the clamped position relative to dropouts 32a and 32b and the hub assembly 30 is firmly clamped and installed with the dropouts 32a ad 32b.

The stepped portion 65 is now axially overlapping the dropout 32b by distance 125' to more completely axially overlap pilot region 127 to be further radially retained and engaged with the dropout 32b. Similarly, the end portion 99 is axially overlapping the adapter 100 by distance 117' to be further radially retained and engaged with the dropout 32a. The radial retaining afforded by axial overlap distances 117' and 125' provide an added measure of safety in insuring that the hub assembly 30 remains engaged to the dropouts 32a and 32b even if the control shaft assembly 60 was threadably loosened slightly such that the axially gripping of the dropout 32b were inadvertently reduced.

Next, as shown in FIGS. 2f and 2i, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also reducing the propensity for inadvertent snagging on external objects. While the capability to fold handle 66 as described herein is not a requirement for proper function of this embodiment, it serves to provide the convenience of a lower profile assembly, as preferred by many cyclists.

The procedure for uninstallation and removal of the hub assembly 30 from the dropouts 32a and 32b is basically the reverse of the assembly and installation sequence just described. For removal, the handle 66 is first unfolded to the position shown in FIG. 2e. Next, the control shaft assembly 60 is unscrewed, in a direction opposite to direction 122, by manually twisting and torquing against handle 66 until the external threads 62 are disengaged from the internal threads 107, displacing the control shaft assembly 60 in direction 118 into the pre-assembled position shown in FIG. 2h. The handle 66 is then retracted and withdrawn in axial direction 118, against the preload of spring 97, to advance the control shaft in direction 118 until the snapring 64c is abutting end face 70. End face 199 is now axially coincident or inboard of end face 103 and transition surface 75 is axially coincident or outboard of outboard face 40b as shown in FIGS. 2b, 2d, and 2g. At this retracted position of the control shaft assembly 60, the end portion 99 is no longer axially overlapping the counterbore 109 and the stepped portion 65 is no longer axially overlapping the pilot portion 127 and the aforementioned radial engagements are released, permitting the hub assembly 30 to be radially removed from the frame opposite to direction 120 to complete the removal or uninstallation procedure. Since distances 117 and 125 are equal or nearly equal, the release of these two radial engagements are axially timed to initiate and occur generally simultaneously as mentioned hereinabove.

Note that, as the control shaft assembly 60 is retracted in direction 118 past the pre-assembled position, the end portion 99 is radially released from counterbore 109 simultaneous to the collar portion 65 being radially released from the pilot region 127. By coordinating these two axial overlap distances, the radial release of both the end portion 99 and the collar portion 65 will occur simultaneously as the control shaft assembly 60 is axially retracted in direction 118. This reduces the possibility that the hub assembly 30 will hang up adjacent either outer face 46a or 46b, allowing the hub assembly to be skewed or otherwise misaligned as it is removed or uninstalled from the dropouts 32a and 32b.

While the hub assembly 30 is retained to dropouts 32a and 32b with the control shaft assembly 60 in the pre-engaged position, this retained configuration normally serves as a convenience to maintain the axial alignment of the control shaft assembly 60 with respect to the dropouts 32a and 32b. The pre-engaged position also serves as a safety retaining means to restrict separation of the hub assembly 30 from the dropouts 32a and 32b in the event that the control shaft assembly 60 is inadvertently not placed in the clamped position. While the clamped position is not required to assemble the hub assembly 30 to the dropouts 32a and 32b, the threadable assembly associated with the clamped position is preferred and serves to fortify and solidify this assembly.

While the embodiment of FIGS. 2a-n shows the control shaft assembly 60 as biased by the compression spring 97 toward the extended position, it is envisioned that the control shaft assembly 60 may alternatively be biased toward the retracted position. For example, the compression spring 97 may instead be positioned between snapring 64b and shoulder 41 to bias the control shaft assembly 60 in direction 118. It should be noted that the spring-bias provided by spring 97 as described herein provides a convenience and is not a requisite for the proper functionality of the present invention.

In addition to being axially shuttled in the extending direction 121 and the retracting direction 118 as described, the control shaft 61 has a generally smooth circular cylindrical surface such that, in both the extended and retracted positions, the control shaft assembly 60 may be rotated relative to the sleeve 58 about the axial axis 28. Such rotation is especially beneficial when attempting to threadably engage external threads 62 with internal threads 107. Meanwhile, adapter 100 is axially and rotationally fixed to the dropout 32a of the frame (not shown). Thus, the axially displaceable (in directions 118 and 121) control shaft assembly 60 of the hub assembly 30 is operative to selectively engage the dropout 32a. It is noted that the control shaft assembly 60 is freely rotatable at all points in its axial travel. This is a preferred feature, since the control shaft 61 must be rotatable to threadably assemble the external threads 62 with internal threads 107. In an alternative design, the control shaft assembly 60 may be rotatably keyed to the sleeve 58 or another portion of the axle assembly 24 about axial axis 28 or else the control shaft assembly 60 may employ a rotationally yieldable detent mechanism relative to the sleeve 58.

The combined assembly of the sleeve 58 and axlecaps 42 and 44 serve as an outer axle assembly that is discreet from the control shaft assembly 60. This outer axle assembly is axially fixed relative to the hub shell 20, while the control shaft assembly may be axially shuttled within this outer axle assembly. Alternatively, the components of the outer axle assembly may be omitted and the control shaft assembly may be axially shuttled within the bearings 33a and 33b.

FIG. 2j describes an alternate dropout 136 that may be substituted for the dropout 32a, the adapter 100, and the nut 110. Dropout 136 is a monolithic or an integral assembly that incorporates the geometry and features of the adapter 100. Dropout 136 includes hole 140, inboard face 142, and a concave alignment surface 138. Hole 140 includes a counterbore 144 portion that extends axially from inboard face 142 through a portion of hole 140 and is of a diameter sized to accept the major diameter of external threads 62 of the control shaft 61. Hole 140 also includes an internal thread 141 portion (obscured) extending axially outboard from the base of the counterbore 144 through the remainder of the dropout 136. Internal threads 141 are sized to threadably mate with external threads 62 of the control shaft 61.

As shown in FIG. 2a, dropout 32a is of a generally conventional "slotted" design and includes an open slot 36a to receive a conventional hub assembly (not shown). Adapter 100 and nut 110 are required to adapt dropout 32a to receive the hub assembly 30, as shown in FIG. 2c. Alternatively, dropout 136 may be substituted for the combined assembly of dropout 32a, adapter 100, and nut 110. As shown in FIG. 2j, dropout 136 is purpose-built to receive the hub assembly 30 and incorporates geometry and features otherwise included in the adapter 100. These geometries and features have similar functionality to the analogous geometries and features associated with the adapter 100 and as described herein. Dropout includes inboard face 142, which corresponds to inboard face 38a, and alignment surface 138, which corresponds to alignment surface 106, and hole 140 with internal threads 141 and counterbore 144, which corresponds to hole 104 with internal threads 107 and counterbore 109. Dropout 136 may thus be substituted for dropout 32 and adapter 100 and nut 110 to receive the hub assembly 30 as described in FIGS. 2c-e.

FIGS. 2L and 2m illustrate the interaction between the control shaft 61 and the dropout 32b in greater detail. For clarity and simplification of illustration, these two figures show only the dropout 32b and the control shaft 61, while the most of the other components of the hub assembly 30 are not shown here. FIG. 2L corresponds to the transition between the assembly sequence shown in FIG. 2c and FIG. 2d, with the shank portion 88 passing through the necked entrance region 126 of open slot 36b in direction 120. The shank portion 88 has a cross-sectional diameter 135 that is smaller and radially relieved relative to diameter 131. It may be seen that the slot width 37b is sized to let the shank portion 88 pass therethrough, however the slot width 37b is smaller than the diameter 131 of the stepped portion 65. As shown in FIG. 2m, the hub assembly 30 is further advanced in direction 120 until the alignment surface 43b is radially abutting and nested within alignment face 129 (as shown in FIG. 2g). The control shaft assembly 60 has been axially advanced in direction 121 until the stepped portion 65 is axially overlapping the pilot region 127, which corresponds to the assembly sequences of FIGS. 2e, 2f, 2h, and 2i. As illustrated in FIG. 2m, the stepped portion 65 has been axially shuttled to be positioned within the pilot region 127 of the open slot 36b. The diameter 131 of stepped portion 65 is sized to be larger than the width 37b of the necked entrance region 126 such that the control shaft 61 is now axially piloted and radially retained within the pilot region 127, thereby causing the hub assembly 30 to be radially retained with the dropout 32b and preventing the hub assembly 30 from becoming separated from the dropout 32b. FIG. 2m describes the interaction between the stepped portion 65 and the pilot region 127 in both the pre-engaged and engaged positions.

Finally, as shown in FIGS. 2f and 2i, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also and reducing the propensity for inadvertent snagging on external objects. While the capability to fold handle 66 as described herein is not a requirement for proper function of this embodiment, it serves to provide the convenience of a lower profile assembly, as preferred by many cyclists.

It should be noted that the spring-bias provided by spring 97 as described herein provides a convenience and is not a requisite for the proper functionality of the present invention.

As shown in FIGS. 2b-d and 2g, with the control shaft assembly 60 in the retracted position, the end portion 99 is shown to be slightly axially recessed relative to the outer face 46a. Alternatively, the mechanism may be arranged such that the end portion 99 may be axially flush or else axially protruding from outer face 46a in the retracted position.

Since it is highly desirable to allow for fast installation of the hub assembly, it is preferable to use a "fast" multiple-lead thread form for the threadable engagement between external threads 62 and internal threads 107, rather than a common conventional single-lead thread form. The embodiment of FIGS. 2a-n utilizes such a multiple-lead thread in the form of a double-lead thread (also sometimes termed a "twin-start" or "two-start" thread). In the example described in FIGS. 2a-n, it is generally preferable to utilize a double-lead or triple-lead thread form, as further increasing the number of leads may adversely reduce the axial clamping force provided by this threaded engagement.

As defined herein, a multiple-lead thread is a thread form where the number of thread leads is greater than one. Besides a double-lead, other examples of multi-lead threads are a triple-lead or a four-lead thread form, and so on. A multiple-lead thread form is sometimes alternatively termed as a "multiple-start" thread form, since the thread has a single start for each thread lead. A thread is a ridge of generally uniform section in the form of a helix on the external or internal surface of a cylinder. The lead of the thread is the axial distance that the threadable engagement will advance with one full revolution of the externally threaded part relative to a rotationally fixed internal threaded part (or vice-versa). A multiple-lead thread utilizes a corresponding multiplicity of helical thread ridges wrapping about an axial axis along the same internal or external surface of the cylinder. It is preferable that these multiple helical ridges are evenly circumferentially spaced around the cylinder. For example, the two helical ridges of a double lead are circumferentially spaced by 180 degrees, and the three helical ridges of a triple lead are circumferentially spaced by 120 degrees, and so on. While it is possible to threadably mate a multiple-lead internal thread with a single-lead external thread of larger pitch (and vice-versa), it is normally preferable that both the internal and external threads of a threadable engagement have the same pitch and the same number of leads.

Further, as defined herein, at least one of the internal and external threads of the multi-lead thread extends to wrap helically about a circumferential angle greater than 180 degrees, and preferably greater than 360 degrees, and more preferably greater than 720 degrees. These threads may be a continuous helix or they may be an interrupted helix where the thread ridge of the continuous helix is otherwise notched or a middle portion of the helical ridge is truncated or removed.

The double-lead thread is detailed in FIG. 2n, where the thread form of external thread 62 includes two helical thread ridges such that this thread has a pitch 133 and a lead 134 that is twice the pitch 133. The pitch 133 is the axial distance from the crest of one thread to the next. The lead 134 is the axial distance corresponding to one complete revolution of the control shaft 61. With conventional single-lead threads, the pitch equals the lead. With double-lead threads, the lead is twice the pitch. With triple-lead threads, the lead is three time the pitch, and so on. Given the same thread pitch, a greater number of thread leads corresponds to a steeper helix angle of the helical ridges. These terms and relationships regarding multiple-lead threads are well-known in industry. Further, the axial thread length 137 of external threads 62 is sized to provide an axial thread engagement length with internal threads 172 that is preferably greater than the pitch diameter 139 of external threads 62 and that includes multiple thread leads 134.

For clarity, many other parts of the hub assembly 30 are not shown in FIG. 2n, but it is understood that the complete hub assembly 30 is implied and is otherwise included. The internal thread 107 of the adapter 100 has a double-lead thread as well, to threadably mate with external thread 62. This means that, when internal thread 107 is threadably mated to external thread 62, a single revolution of the control shaft 61 will cause the control shaft 61 to advance by two pitches 133 and by one lead 134. In other words, the control shaft assembly 60 will advance twice as quickly (and with half the number of revolutions) with this double lead thread engagement than it would with a conventional single-lead thread engagement. Further, since a double-lead thread engagement has two thread starts, the control shaft assembly 60 will only need to rotate a maximum of 180 degrees in order to get the threaded engagement to initiate and "catch" and engage with the internal threads 107. In contrast, with a conventional single-lead engagement, the control shaft assembly 60 will need to rotate a maximum of 360 degrees in order to get the first thread to "catch" and engage with the internal threads 107. Thus, the double-lead engagement reduces the average number of revolutions of the control shaft assembly 60 needed to install and clamp the hub assembly 30 to the dropouts 32a and 32b. Further, the double-lead thread engagement has a steeper thread helix than a conventional single-lead engagement, thus reducing the potential of cross-threading between the external threads 62 and internal threads 107, as described hereinabove. Further, since the double-lead thread has two thread starts that are circumferentially opposed (by 180 degrees), this thread engagement will initiate at both starts simultaneously, which serves to immediately bring the mating threads into axial alignment, further minimizing the potential for cross-threading. Reduced potential for cross-threading reduces the possibility of thread damage and adds to the convenience, reliability, and ease-of-use for the operator.

Yet further, in order for a conventional single-lead thread engagement to achieve a comparable lead to a double-lead engagement, the thread form commonly must have much greater radial depth. This deeper thread form would remove more material from the end portion 99, thereby reducing its effective diameter and weakening the control shaft 61. In contrast, a double-lead thread does not require this deep thread form and thus results in a stronger and more robust control shaft 61. Thus, it may be seen that the double-lead thread engagement described herein is very much preferable to a conventional sing-lead thread engagement. Further, other multiple-lead thread engagements may be substituted for the single-lead or double-lead thread engagement, such as a triple-lead and quadruple-lead thread engagement, among others.

It is noted that the control shaft assembly 60 is freely rotatable at all points in its axial travel. This is a preferred feature, since the control shaft 61 must be rotatable to threadably assemble the external threads 62 with internal threads 107. However, the control shaft assembly 60 may alternatively be rotationally fixed to the sleeve 58 or else the control shaft assembly 60 may employ a rotational detent mechanism relative to the sleeve 58.

While the alignment surfaces 106 and 129 provide a convenient circular cylindrical surface to nest with the circular cylindrical surface geometry of the alignment surfaces 43a and 43b, these alignment surfaces may alternatively have a wide range of geometries, some of which may not be circular, that may create a rotationally keyed engagement therebetween. As a further alternative, the alignment surfaces 106 and/or 129 may be eliminated entirely and the control shaft 61 may instead serve to provide the radial locating interface with dropouts 32a and/or 32b.

Figure 2O:
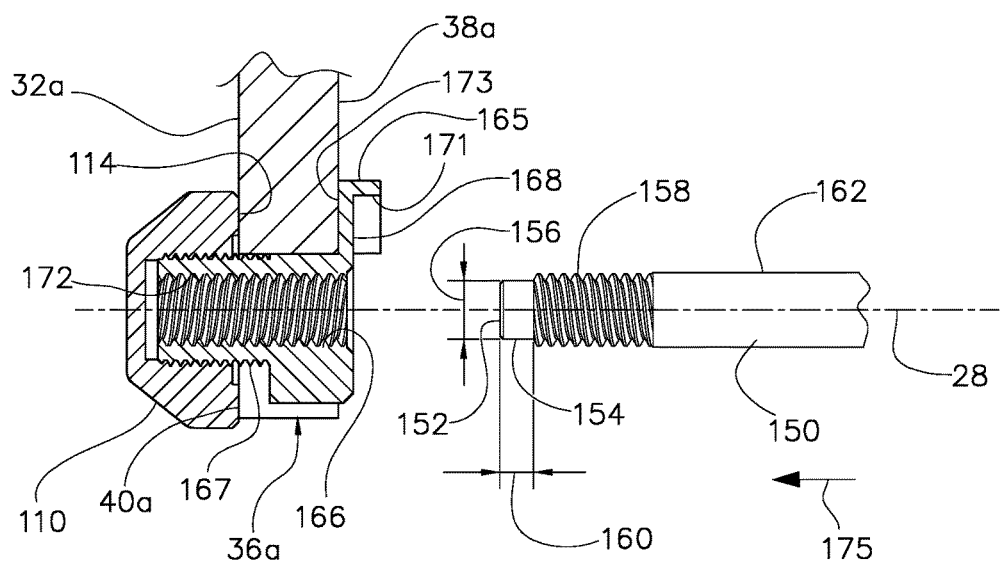
FIG. 2o is a cross sectional detail view corresponding to FIG. 2n, describing an alternate design where the counterbore is eliminated in favor of a pilot tip of the control shaft to provide piloting and pre-engagement of the control shaft with the threaded hole of the left dropout.

FIGS. 2a-n describe a design where the adapter 100 includes a counterbore 109 to radially retain the end portion 99 when the control shaft assembly 60 is in the pre-engaged position, as described in FIG. 2h. This counterbore also serves to pilot and align the end portion 99 prior to threadable engagement between external threads 62 and internal threads 107. Alternatively, the counterbore 109 may be eliminated in favor of a pilot tip 154 of the control shaft 150 to pilot and pre-engage the inside diameter of internal threads 172 as described in FIG. 2o. As shown in FIG. 2o, the control shaft 150 is identical to control shaft 6l except that the end portion 152 of the shank portion 162 includes an unthreaded pilot tip 154 of diameter 156 that projects axially outwardly from external threads 158 by axial length 160. Adapter 165 is identical to adapter 100 except that adapter 165 does not include a counterbore 109. Adapter 165 includes externally threaded collar 167, hole 166, shoulder 173, end face 168, and a concave alignment surface 171. Hole 166 includes internal threads 172 extending axially therethrough. Internal threads 172 are sized to threadably mate with external threads 158 of the control shaft 150. Nut 110 and dropout 32a are identical to those described in FIGS. 2a-n. For clarity, many other parts of the hub assembly 30 are not shown in FIG. 2o, but it is understood that the complete hub assembly 30 is implied and is otherwise included.

The diameter 156 of pilot tip 154 is sized to have clearance with the inside diameter of internal threads 172 such that, when the control shaft 150 is axially shuttled in direction 175 to achieve the pre-engaged position (as described in FIG. 2h), the pilot tip 154 will axially overlap the internal threads 172 such that the end portion 152 will be axially overlapping and radially retained to the adapter 165 in a manner similar in effect to that described in FIG. 2h. The control shaft 150 may then be threadably assembled to the adapter 100 as described in FIGS. 2e, 2f, and 2i. It is noted that a further alternate design may include both a pilot tip of the control shaft and a counterbore of the adapter to provide an axially overlapping and radially retained engagement therebetween when the control shaft is in the pre-engaged position.

Figure 2P:
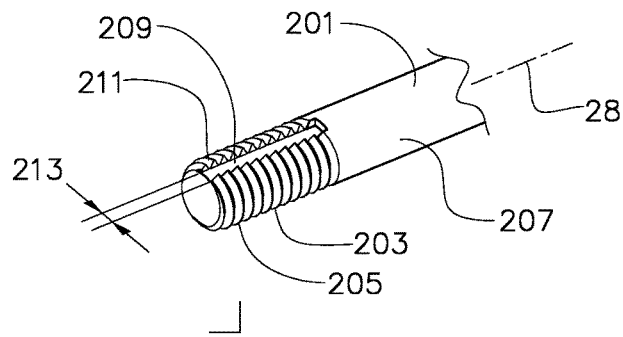
FIG. 2p is a partial perspective view, describing an alternate thread variation that includes interrupted threads.

FIG. 2p shows how the external threads 203 of the control shaft 201 may have an interrupted thread ridge. Control shaft 201 is shown to include shank portion 207 with end portion 205 having multiple-lead external threads 203 with an axially extending groove 209 that serves to create a notch or interruption in the helical thread ridge(s) 211 of external threads 203. The groove 209 removes material from a localized region of the thread ridge(s) 211 and, as shown, creates a series of interrupted thread ridges 211 in a configuration known in industry. The circumferential width 213 of the groove 209 is narrower than the circumferential width of the mating internal thread ridge (not shown), which will bridge this width 213 to provide continuous smooth thread engagement therebetween that is similar to the threadable engagement of a continuous and non-interrupted thread ridge. The threadable engagement may helically span across several of these interrupted thread ridges to result in a robust thread engagement. As such, an interrupted thread is considered to provide a conventional threadable engagement that has a circumferential angle of overlap that is greater than 360 degrees. This is in contrast to such quarter-turn type fastener engagements described hereinabove, that does not have a continuous thread engagement and that commonly has a circumferential angle of overlap of less than 180 degrees, and commonly less than 90 degrees. It is also understood that internal threads may also be interrupted with similar result. Control shaft 201 is otherwise identical to control shaft 60 of FIGS. 2a-n.

Figure 3A:
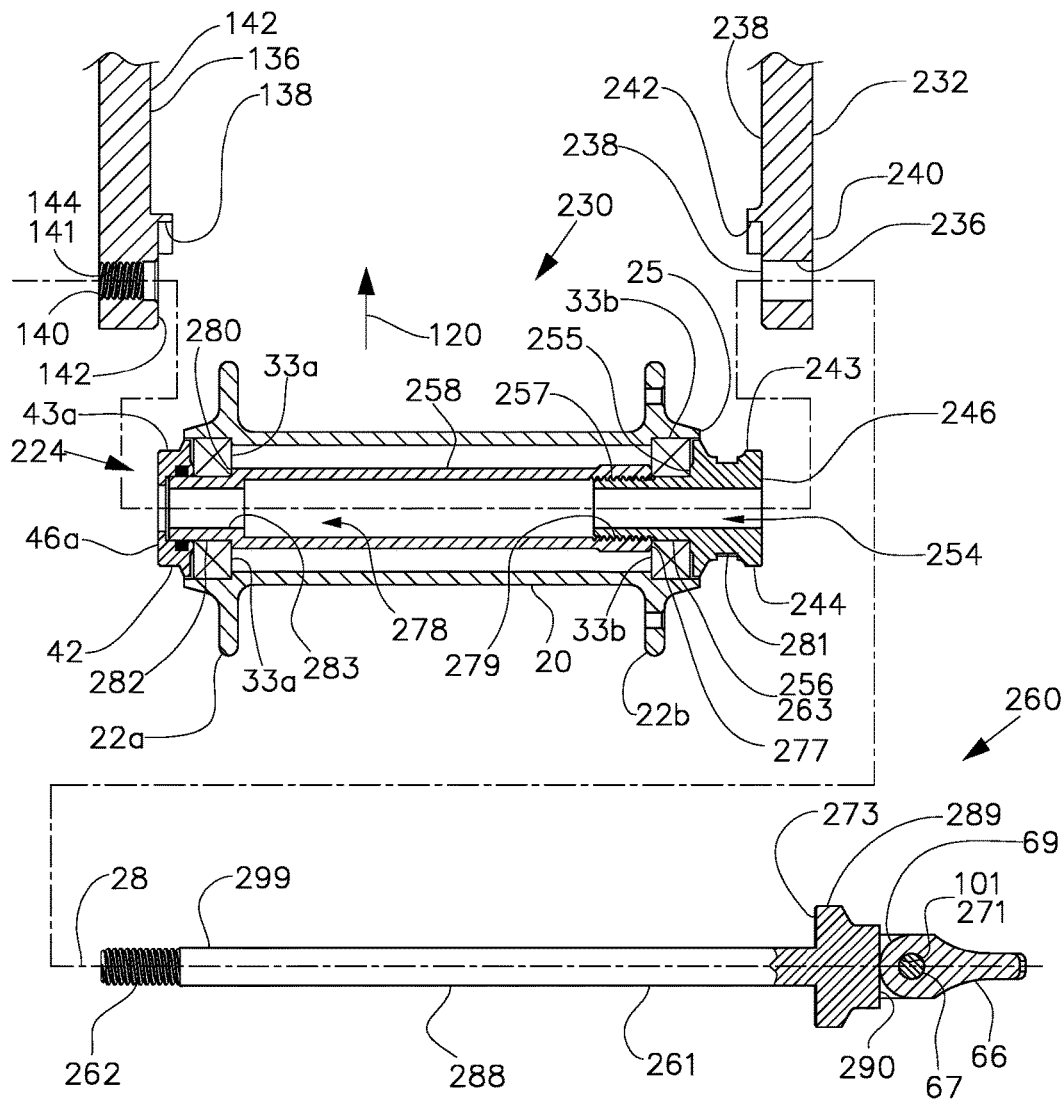
FIG. 3a is an exploded axial cross section view of a second embodiment of the present invention, showing the dropouts of the bicycle frame and a hub assembly, including a conventional through-axle type control shaft assembly prior to its assembly to the hub assembly and dropouts.
Figure 3B:
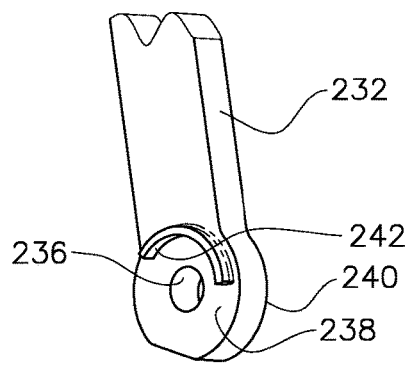
Figure 3C:
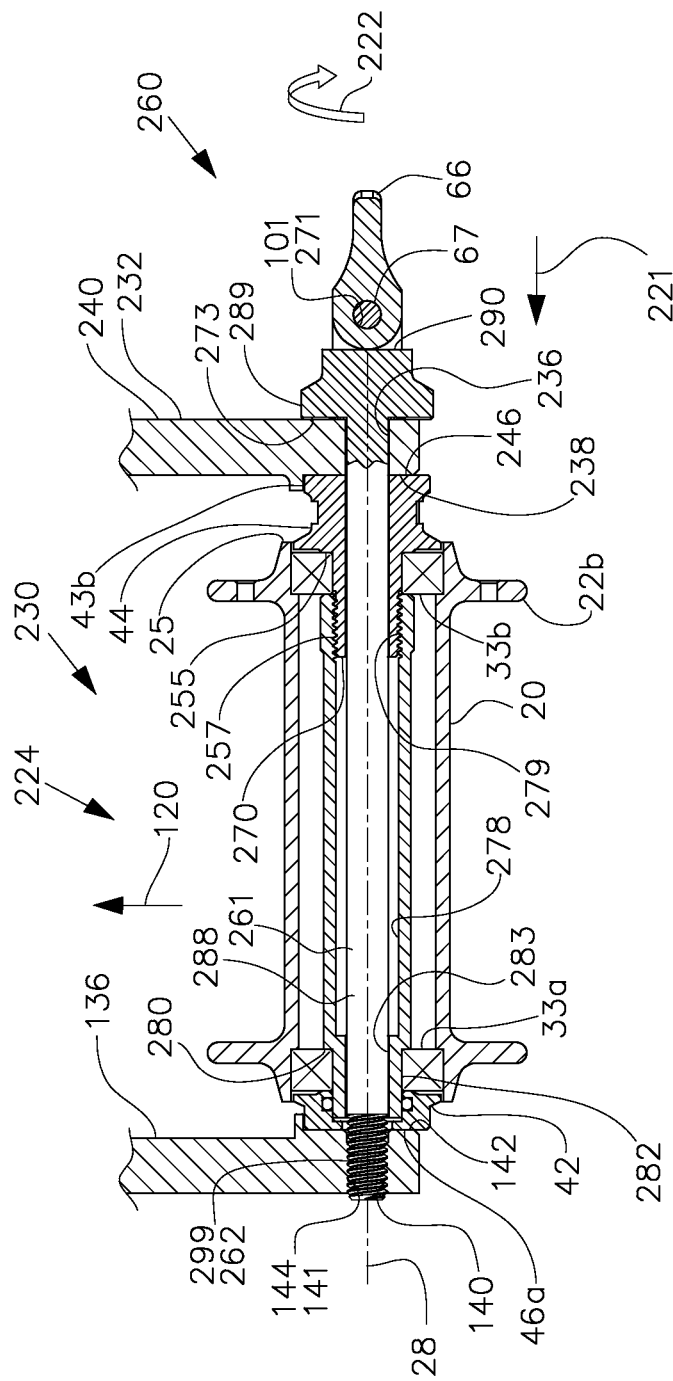
FIG. 3c is an axial cross section view of the embodiment of FIG. 3a, showing the hub assembly positioned between the dropouts and the control shaft positioned to assemble the hub assembly to the dropouts.

FIGS. 3a-c describe a second embodiment where the multi-lead thread may be applied to a conventional through-axle arrangement. Orientation conventions are identical to those described in FIGS. 2a-n. The hub assembly 230 is comprised of axle assembly 224, control shaft assembly 260, hub shell 20, and bearings 33a and 33b. The axle assembly 224 includes axlecap 244, sleeve 258, and axlecap 42. The control shaft assembly 260 includes the control shaft 261, handle 66, and pivot pin 67. Handle 66, pivot pin 67, hub shell 20, bearings 33a and 33b, and axlecap 42 are identical to those described in FIGS. 2a-n.

The control shaft 261 includes a shank portion 288 and an enlarged head portion 289. The head portion 289 includes a grip face 273, a slot 290 to accept the pivot tab 69 of the handle 66, and a cross hole 271 sized to accept the pivot pin 67. The shank portion 288 includes end portion 299 with external threads 262 at its engagement end. External threads 262 are multi-lead threads to threadably engage with multi-lead internal threads 141 of dropout 136 upon assembly. The handle 66 is assembled to the control shaft 261 by means of pin 67 and as also described hereinabove.

The sleeve 258 includes an axial opening 278 therethrough, with internal threads 279 and end face 277 at its handle end. Sleeve 258 also includes shoulder 280, collar 282, and hole 283 at its engagement end that is sized to accept and radially pilot the control shaft 261. Axlecap 244 includes outer face 246, alignment surface 243, shoulder 255, collar portion 256, and an axially extending hole 254 therethrough. Axlecap 244 also includes flats 281 for rotational manipulation with a wrench (not shown). Collar portion 256 includes a threaded portion with external threads 257 to mate with internal threads 279 of the sleeve 258 and a smooth cylindrical portion 263 to pilot the inside diameter of bearing 33b. Holes 283 and 254 constitute the exposed openings of a continuous axial hole that extends through the axle assembly 224 to accept the shank portion 288.

Dropouts 232 and 136 may be considered mounting portions of the bicycle (not shown) and constitute the portion of the frame (not shown) to which the hub assembly 230 is mounted or connected. Dropout 136 is identical to that described in FIG. 2j. Dropout 232 is similar to right dropout 32b and is detailed in FIG. 3b to show an axially inboard face 238a, an axially outboard face 240a, and alignment surface 242. Axially extending hole 236 is substituted for open slot 36b. Hole 236 is sized to accept the shank portion 288 of the control shaft 261. In comparison with open slot 36b, hole 236 is an enclosed hole that does not permit the control shaft 261 to be radially removed therefrom. Inboard faces 238 and 142 are axially opposed and face each other. The dropouts 232 and 136 shown here are more typical of the front dropouts of a bicycle frame, but the rear dropouts may be similar in design and it is understood that this design is representative of a wide range of dropout designs, either conventional or unconventional.

FIG. 3c shows the hub assembly 230 as assembled to the dropouts 232 and 136. The hub assembly 230 is first positioned between the dropouts 232 and 136 as shown, with alignment surfaces 43a and 243 radially nested with alignment surfaces 138 and 242 respectively. Next, the shank portion 288 is passed (in direction 221) through hole 236, hole 254, hole 278, hole 283, and finally threadably assembled to hole 140 by rotating control shaft 261 in direction 222, with external threads 262 threadably engaged to internal threads 141. As this threadable engagement is threadably tightened, the axial distance between grip face 273 and outer face 246 contracts, which serves to axially sandwich and clamp the dropout 232 with grip face 273 bearing against outboard face 240 and outer face 246 bearing against inboard face 238. Simultaneously, dropouts 232 and 136 are drawn toward each other with inboard faces 238 and 142 bearing against outer faces 246 and 46a respectively to axially clamp and sandwich the axle assembly 224 therebetween.

The arrangement of the hub assembly 230 and dropouts 232 and 136, as well as the assembly therebetween is schematically typical for conventional prior-art through-axle arrangements well known in industry. However, prior-art through-axle arrangements commonly utilize a conventional single-lead thread engagement between the external threads 262 and internal threads 141, whereas the present invention utilizes a multi-lead thread engagement to provide the numerous advantageous benefits described hereinabove.

The embodiments of FIGS. 2a-n and FIGS. 3a-c include a control shaft with an axially extending shank portion that is axially fixed to a head portion. Further, with reference to FIGS. 2a-n, these embodiments include external threads (not shown) of the control shaft threadably engaged to internal threads of a left dropout (32a, 136), in a general arrangement as described in FIGS. 2a-n. Still further, these embodiments describe a grip face that is axially clamping and gripping a dropout or mounting portion of the frame. In contrast, the embodiment of FIGS. 4a-b describes an internally threaded nut assembly 425 that eliminates a shank portion in favor of an axially extending hole 402 with internal threads 403. Further, the grip face 484 serves to axially grip directly against the axlecap 412 of an axle portion 413 instead of a dropout. Further, the arrangement of FIGS. 4a-b utilizes only a single dropout 423 that includes a central shaft 416 that serves to radially pilot axlecaps 412a and 412b.

Figure 4A:
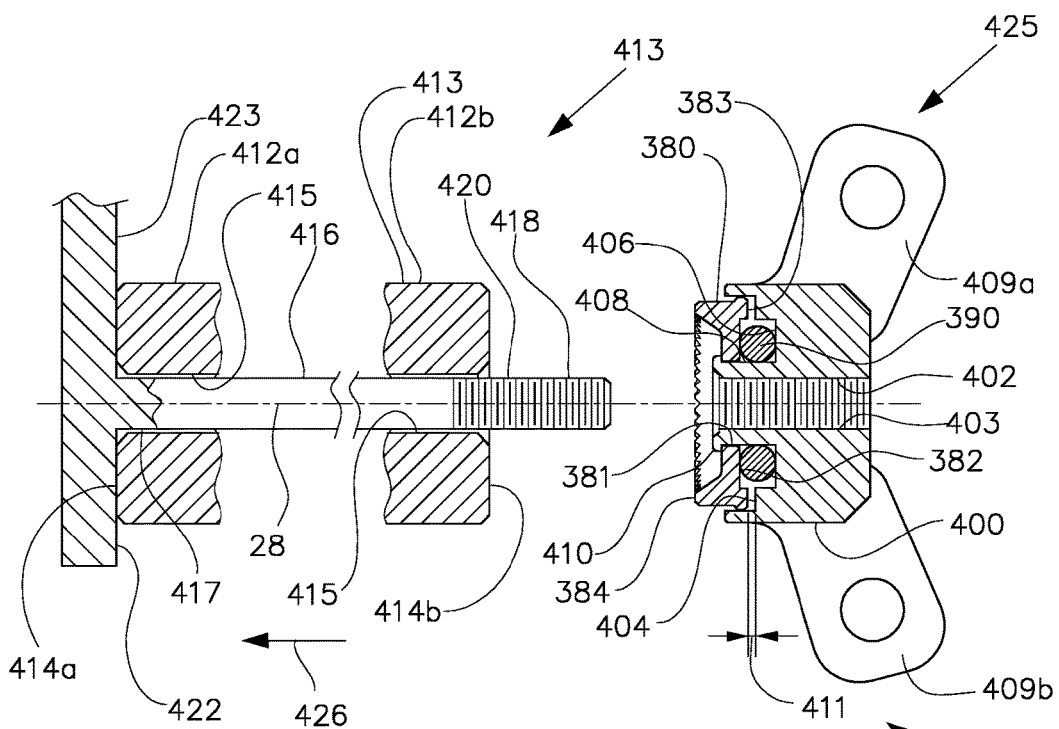
FIG. 4a is a partial axial cross section exploded view of a third embodiment of the present invention, with a nut assembly serving as a head portion that includes internal threads to mate with external threads of a central shaft, including a grip washer and a rotatable clamping flange and including an axially resilient elastomer washer axially positioned therebetween.

FIG. 4a is an exploded view, showing the nut assembly 425 prior to its threadable assembly with the central shaft 416 to secure the axle portion 413 thereto. Nut assembly 425 includes nut 400, grip washer 380 and o-ring 390. Axle assembly 407 includes axle portion 413 and nut assembly 425. Nut 400 includes: an axially extending through hole 402 with internal threads 403; a pair of handles 409a and 409b to facilitate manual manipulation of the nut assembly 425 in a manner similar to a wingnut; a recess face 406, a clamp face 404; and a collar portion 408 with a flared portion 410 that is deformably flared radially outwardly to axially retain the grip washer 380 as shown. The flared portion 410 may be considered a means to retain the grip washer 380 to the nut 400. Grip washer 380 includes a hole 381 therethrough, a grip face 384, a back face 383, and a pressure face 382. O-ring 390 is an annular element made of elastically resilient elastomer material and circumferentially surrounds the collar portion 408 and is axially positioned between the pressure face 382 and the recess face 406. The axially outward elastic preload provided by the o-ring 390 also serves to create an axial gap 411 between the back face 383 and the clamp face 404. Axlecaps 412a and 412b include outer faces 414a and 414b respectively and serve as axial end portions of an axle portion 413 with an axially extending central opening 415 therethrough. Axle portion 413 is analogous to the assembly between sleeve 58, axlecap 42, and axlecap 44 of FIGS. 2a-n. Axle portion 413 constitutes a portion of a hub assembly (not shown) that may include bearings and hub shell as described in FIG. 2a-n. Central shaft 416 is generally analogous to a control shaft and includes a first end portion 417 fixed to a dropout 423 and a second end portion 418 extending to a point axially outboard of outer face 414b that includes external threads 420. External threads 420 and internal threads 403 are matched multi-lead threads as described hereinabove. Axle portion 413 is first assembled to dropout 423 in direction 426, with central shaft 416 extending through opening 415 as shown, until outer face 414a axially abuts inboard face 422 of dropout 423. The central shaft 416 may be considered as an extension of the dropout 423 that axially overlaps the axle portion 413. Central shaft 416 may also be considered to have some similar schematic features of control shaft 61 of FIGS. 2a-n.

Figure 4B:
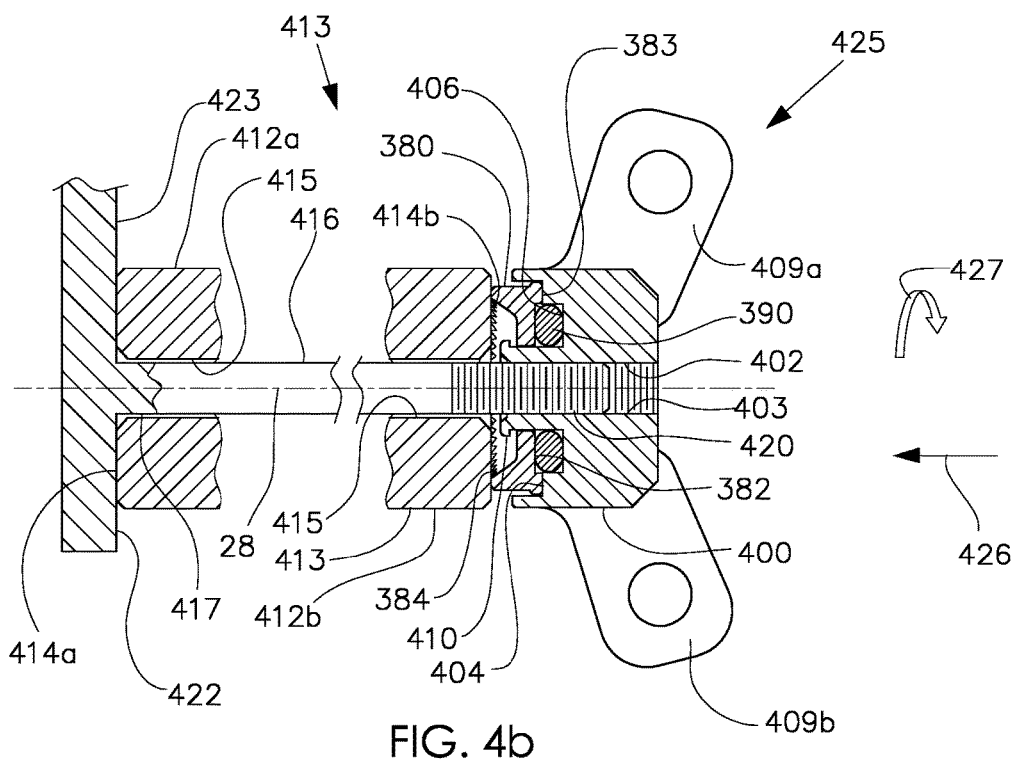
FIG. 4b is a partial axial cross section view of the embodiment of FIG. 4a, showing the hub assembly piloted on the central shaft and axially clamped to the dropout by the nut assembly.

In contrast to the embodiment of FIGS. 2*a-n* where the axle assembly 24 is secured between two axially spaced dropouts 32*a* and 32*b*, FIGS. 4*a-b* describe an axle assembly 407 that is axially cantilevered off of a single mounting portion or dropout 423. In further contrast to FIGS. 2*a-n*, where the dropout 32*a* of the frame (not shown) includes internal threads 107 fixed thereto to receive the hub assembly 30, FIGS. 4*a-b* show the dropout 423 of the frame (not shown) to have external threads 420 to threadably mate with internal threads 403 of the axle assembly 407 (of the hub assembly, not shown).

As shown in FIG. 4*b*, the nut assembly 425 has next been assembled to the central shaft 416, with internal threads 403 threadably engaged to external threads 420 in a multi-lead thread engagement. As nut 400 is rotated in direction 427, the nut assembly 425 is threadably advanced in direction 426 until the grip face 384 contacts outer face 414*b* and the o-ring 390 is elastically deformed and compressed as shown in FIG. 4*b*.

Next, the nut assembly 425 is further rotated in direction 427 by means of manual manipulation of handles 409*a* and 409*b*, which serves to further threadably tighten the nut assembly 425 with the central shaft 416. This threadable tightening in direction 427 serves to rotate and further draw the nut assembly 425 in the axially inward direction 426 until the clamp face 404 contacts and abuts the back face 383 and the axle portion 413 is axially clamped and sandwiched between grip face 384 and inboard face 422. The axle assembly 407 (and hub assembly, not shown) is now firmy secured to the dropout 423.

The o-ring 390 provides a frictional coupling and an axially distal preload and bias between the recess face 406 and the pressure face 382. The axial distal preload serves to insure that the mating thread flanks of the threadable engagement remain in contact with sufficient friction and preload therebetween to impede inadvertent threadable loosening as also described hereinabove.

The rotational coupling described in FIG. 4*b* is a yieldable coupling and the threadable loosening and disassembly of the nut assembly 425 is simply the reverse of the sequence described hereinabove. As shown in FIG. 4*b*, the grip washer 380 is rotationally fixed to the stationary axle portion 413 due to the frictional interface between the grip face 384 and the outer face 414*b* and between the outer face 414*b* and the inboard face 422. The o-ring 390 serves as an axially resilient element to rotationally couple the nut assembly 425 to the dropout 423 and serves to inhibit threadable loosening of the nut assembly 425. The embodiment of FIGS. 4*a-b* describes a passive rotational coupling mechanism that is primarily energized by the o-ring 390. After assembly as shown in FIG. 4*b*, threadable loosening may only be achieved by overriding this rotational coupling mechanism. Even if threadable loosening of the nut assembly 425 were initiated, the axial resilience of this mechanism insures that this rotational coupling is maintained over an angular rotation range of the nut assembly 425 to continue to inhibit further threadable loosening.

While my above description contains many specificities, these should not be construed as limitations on the scope of the invention, but rather as exemplifications of embodiments thereof. For example:

While the embodiment of FIGS. 4*a-b* show the central shaft 416 as integral and monolithic with the dropout 423, the central shaft may alternatively be formed as a separate component from the dropout. The separate central shaft and dropout components may be connected to each other to create an arrangement similar to that described in FIGS. 4*a-b*.

The control shaft of the embodiments described herein are shown to have external multi lead threads that mate with internal multi-lead threads of the frame (as shown in FIGS. 2*a-n* and FIGS. 3*a-c*) or with internal multi-lead threads 403 of a nut 400. Alternatively, the control shaft may include internal multi-lead threads that mate with external multi-lead threads of the frame or with an externally threaded bolt-type element to provide similar function to the embodiments described herein.

While the embodiment of FIGS. 2*a-n* show the control shaft 61 as threadably connected to the adapter 100 that is directly connected to the frame, this is merely a representative arrangement to illustrate the multi-lead threadable connection. As an alternative example, the adapter 100 may be omitted and the nut 110 may be modified to include multi-lead internal threads to threadably mate with external threads 62 of the control shaft 61. In such an arrangement, the control shaft assembly 60 may be threadably tightened with the nut, to axially clamp and sandwich the dropout 32*a*, axle assembly 24, and dropout 32*b* between end face 114 and grip face 73, thereby securing the hub assembly 30 to the dropouts 32*a* and 32*b*.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
    an axle assembly including: (i) an axle sleeve that is rotationally stationary about an axial axis, including an axially extending opening therethrough and (ii) a control shaft extending within said axially extending opening that may be axially manipulated relative to said axle sleeve;
    a frame element, including a first frame member that is rotationally stationary about said axial axis and a second frame member axially spaced from said first frame member by an axial gap;
    wherein said control shaft includes an engagement end, and a control end axially distal from said engagement end that includes an enlarged head portion adjacent thereto with an axially inwardly facing grip face, and a shank portion extending between said engagement end and said grip face;
    wherein said control shaft includes a first engagement surface axially proximal to said engagement end and a second engagement surface axially proximal to said control end, with an axial distance between said first engagement surface and said second engagement surface;
    wherein said first frame member includes a first retaining surface;
    wherein said second frame member includes an open slot, with an open entrance portion to radially receive said control shaft, and a second retaining surface;
    wherein said axle sleeve is positioned within said axial gap;
    wherein said control shaft is axially displaceable relative to said axle sleeve between:

(i) a retracted position, wherein said engagement end is in an axially inward orientation and said control shaft is radially disengaged from both said first frame member and said second frame member, and said hub assembly may be radially displaced relative to both said first frame member and said second frame member;

(ii) a pre-engaged position, wherein said engagement end is axially outward relative to said retracted position, and wherein said first engagement surface is axially overlapping said first retaining surface by a first overlap distance such that said first engagement surface is radially overlying said first retaining surface in a first radial engagement to radially retain said hub assembly with said first frame member, and said second engagement surface is axially overlapping said second retaining surface by a second overlap distance such that said second engagement surface is radially overlying said second retaining surface in a second radial engagement to radially retain said hub assembly with said second frame member; and (iii) an engaged position wherein said axle assembly is secured to said first frame member by means of a multi-lead threadable engagement therebetween;

wherein said multi-lead threadable engagement may be manipulated between a threadably engaged arrangement serving to provide a securing means to secure said axle assembly to said frame element and a threadably released arrangement serving to remove said securing means; and wherein said control shaft may be axially shuttled relative to said axle sleeve in an engaging direction corresponding to the axially outwardly direction of said engagement end and a retracting direction corresponding to the axially inwardly direction of said engagement end, and wherein, at least one of: (i) when said control shaft is axially shuttled in the engaging direction between said retracted position and said pre-engaged position, said first radial engagement and said second radial engagement are initiated generally simultaneously; and (ii) when said control shaft is axially shuttled in the retracting direction between said pre-engaged position and said retracted position, said first radial engagement and said second radial engagement are released generally simultaneously.

2. The vehicle wheel axle assembly according to claim 1, wherein said control shaft includes a pilot tip adjacent said engagement end and wherein, in said pre-engaged position, said pilot tip is axially overlapping said first frame member and wherein said pilot tip is sized to be equal to or smaller than the minor diameter of said internal threads and wherein, in said pre-engaged position, said pilot tip is axially overlapping said internal threads.

3. The vehicle wheel axle assembly according to claim 1, wherein said first frame member includes a counterbore axially aligned with and axially inboard of said internal threads, and wherein, in said pre-engaged position, said engagement end is axially overlapping said counterbore, and wherein said counterbore is sized to be equal to or larger than the major diameter of said external threads and wherein, in said pre-engaged position, said external threads are axially overlapping said counterbore.

4. The vehicle wheel axle assembly according to claim 1, wherein said control shaft is retained to said axle sleeve to restrict separation between said control shaft and said axle sleeve.

5. The vehicle wheel axle assembly according to claim 1, wherein said first overlap distance is within one millimeter of said second overlap distance.

6. The vehicle wheel axle assembly according to claim 1, wherein said first overlap distance is within three millimeters of said second overlap distance.

7. A vehicle wheel axle assembly, comprising:

an axle assembly including (i) an axle sleeve that is rotationally stationary about an axial axis, including an axially extending opening therethrough and (ii) a control shaft extending within said axially extending opening that may be axially manipulated relative to said axle sleeve;

a frame element, including a first frame member that is rotationally stationary about said axial axis and a second frame member axially spaced from said first frame member by an axial gap;

wherein said control shaft includes an engagement end, and a control end axially distal from said engagement end that includes an enlarged head portion adjacent thereto with an axially inwardly facing grip face, and a shank portion extending between said engagement end and said grip face;

wherein said control shaft includes a first engagement surface axially proximal to said engagement end and a second engagement surface axially proximal to said control end, with an axial distance between said first engagement surface and said second engagement surface;

wherein said first frame member includes a first retaining surface;

wherein said second frame member includes an open slot, with an open entrance portion to radially receive said control shaft, and a second retaining surface;

wherein said axle sleeve is positioned within said axial gap;

wherein said control shaft is axially displaceable relative to said axle sleeve between:

(i) a retracted position, wherein said engagement end is in an axially inward orientation and said control shaft is radially disengaged from both said first frame member and said second frame member, and said hub assembly may be radially displaced relative to both said first frame member and said second frame member; and (ii) an engaged position, wherein said engagement end is axially outward relative to said retracted position, and wherein said first engagement surface is axially overlapping said first retaining surface by a first overlap distance such that said first engagement surface is radially overlying said first retaining surface in a first radial engagement to radially retain said hub assembly with said first frame member, and said second engagement surface is axially overlapping said second retaining surface by a second overlap distance such that said second engagement surface is radially overlying said second retaining surface in a second radial engagement to radially retain said hub assembly with said second frame member;

wherein, in said engaged position, said axle assembly is secured to said first frame member by means of a multi-lead threadable engagement therebetween;

wherein said multi-lead threadable engagement may be manipulated between a threadably engaged arrangement serving to provide a securing means to secure said axle assembly to said frame element and a threadably released arrangement serving to remove said securing means, and including an axial separation between said first radial engagement and said second radial engagement, wherein said axial separation corresponds to said axial gap such that, at least one of: (i) in the transition between said retracted position and said engaged position, said first radial engagement and said second radial engagement are initiated generally simultaneously; and (ii) in the transition between said engaged position and said retracted position, said first radial engagement and said second radial engagement are released generally simultaneously.

8. The vehicle wheel axle assembly according to claim 7, wherein said first overlap distance is generally equal to said second overlap distance.

9. The vehicle wheel axle assembly according to claim 7, wherein said first overlap distance is within one millimeter of said second overlap distance.

10. The vehicle wheel axle assembly according to claim 7, wherein said first overlap distance is within three millimeters of said second overlap distance.

11. The vehicle wheel axle assembly according to claim 7, wherein said threadable engagement is between an external threaded portion of said control shaft and an internal threaded portion of said first frame member.

12. The vehicle wheel axle assembly according to claim 7, wherein one of (i) said axle assembly includes an external threaded portion and said first frame member includes an internal threaded portion; or (ii) said axle assembly includes an internal threaded portion and said first frame member includes an external threaded portion; wherein at least one of said external threaded portion is a multiple-lead thread and said internal threaded portion is a multiple-lead thread and wherein said multiple-lead threadable engagement is between said internal threaded portion and said external threaded portion.

13. The vehicle wheel axle assembly according to claim 12, wherein the number of thread leads of said external threaded portion is equal to the number of thread leads of said internal threaded portion.

14. The vehicle wheel axle assembly according to claim 12, including an adapter element retained to said first frame member, wherein at least a portion of said internal threaded portion of said first frame member is in said adapter element.

15. The vehicle wheel axle assembly according to claim 7, wherein said threadably released arrangement is functional to permit removal and disassembly of said axle assembly from said frame element.

16. The vehicle wheel axle assembly according to claim 7, wherein said threadable engagement is between an internal threaded portion of said axle assembly and an external threaded portion of said first frame member.

17. The vehicle wheel axle assembly according to claim 7, wherein said threadable engagement occurs at said engagement end and wherein said control shaft may be manipulated adjacent said control end to control said engagement end.

18. The vehicle wheel axle assembly according to claim 7, wherein said axle sleeve includes a first outer face axially proximal said first frame member and a second outer face axially spaced and axially opposed to said first outer face, and wherein said threadable engagement is operative to selectively axially sandwich and clamp said second frame element between said grip face and said second outer face.

19. The vehicle wheel axle assembly according to claim 7, wherein said axle sleeve may be assembled to and disassembled from said first frame member in a radial direction with said control shaft extending within said axially extending opening.

20. The vehicle wheel axle assembly according to claim 7, wherein said threadable engagement is a double-lead thread engagement.

21. The vehicle wheel axle assembly according to claim 7, wherein said threadable engagement is a triple-lead thread engagement.

22. The vehicle wheel axle assembly according to claim 7, wherein said threadable engagement is between an external threaded portion that includes a helical external thread ridge and an internal threaded portion includes a helical internal thread ridge, and wherein said external thread ridge and said internal thread ridge are one of a continuous thread ridge or an interrupted thread ridge, and wherein said threadable engagement is between said internal thread ridge and said external thread ridge with a circumferential overlap angle of threadable engagement therebetween that is greater than 180 degrees.

23. The vehicle wheel axle assembly according to claim 7, wherein said threadable engagement is between an external threaded portion that includes a helical external thread ridge and an internal threaded portion that includes a helical internal thread ridge, and wherein said external thread ridge and said internal thread ridge are one of a continuous thread ridge or an interrupted thread ridge, and wherein said threadable engagement is between said internal thread ridge and said external thread ridge with a circumferential overlap angle of engagement therebetween that is greater than 360 degrees.

24. The vehicle wheel axle assembly according to claim 7, wherein said multi-lead threadable engagement has a thread pitch diameter and extends over an axial engagement length, and wherein said axial engagement length is greater than said thread pitch diameter.

25. The vehicle wheel axle assembly according to claim 7, wherein said first frame member is rotationally stationary and said control shaft is rotatably manipulated to achieve said multi-lead threadable engagement.

* * * * *